(12) United States Patent
Yamamoto et al.

(10) Patent No.: US 8,193,749 B2
(45) Date of Patent: Jun. 5, 2012

(54) CONTROL DEVICE AND CONTROL SYSTEM FOR ELECTRIC ROTATING MACHINE

(75) Inventors: Tsuyoshi Yamamoto, Okazaki (JP); Tatsuru Morioka, Okazaki (JP); Junji Miyachi, Anjo (JP)

(73) Assignee: Denso Corporation, Kariya (JP)

( * ) Notice: Subject to any disclaimer, the term of this patent is extended or adjusted under 35 U.S.C. 154(b) by 394 days.

(21) Appl. No.: 12/627,479

(22) Filed: Nov. 30, 2009

(65) Prior Publication Data

US 2010/0134056 A1 Jun. 3, 2010

(30) Foreign Application Priority Data

Nov. 28, 2008 (JP) ................................. 2008-303627

(51) Int. Cl.
*H02P 6/08* (2006.01)
(52) U.S. Cl. ........... 318/400.15; 318/400.3; 318/400.09; 318/400.26
(58) Field of Classification Search ............. 318/400.02, 318/400.3, 400.5, 400.09, 400.15, 400.26
See application file for complete search history.

(56) References Cited

U.S. PATENT DOCUMENTS

| 6,892,120 | B2* | 5/2005 | Kanda .............................. 701/41 |
| 7,986,117 | B2* | 7/2011 | Yamamoto et al. ....... 318/400.26 |
| 8,018,185 | B2* | 9/2011 | Yamamoto et al. ....... 318/400.15 |
| 8,111,893 | B2* | 2/2012 | Chen et al. ..................... 382/131 |
| 2003/0069676 | A1* | 4/2003 | Kanda .............................. 701/41 |
| 2009/0160381 | A1* | 6/2009 | Imura et al. .............. 318/400.15 |
| 2009/0161932 | A1* | 6/2009 | Chen .............................. 382/131 |
| 2009/0161933 | A1* | 6/2009 | Chen .............................. 382/131 |
| 2009/0237021 | A1* | 9/2009 | Yamamoto et al. ....... 318/400.15 |
| 2009/0237022 | A1* | 9/2009 | Yamamoto et al. ....... 318/400.26 |
| 2009/0274355 | A1* | 11/2009 | Chen et al. ..................... 382/131 |
| 2009/0322264 | A1* | 12/2009 | Imura ...................... 318/400.09 |
| 2010/0271853 | A1* | 10/2010 | Furutani et al. ............... 363/132 |
| 2011/0031907 | A1* | 2/2011 | Takahashi ..................... 318/139 |
| 2011/0031910 | A1* | 2/2011 | Takahashi .................. 318/400.3 |
| 2011/0298403 | A1* | 12/2011 | Yamamoto et al. ....... 318/400.02 |

FOREIGN PATENT DOCUMENTS

| JP | 9-47100 | 2/1997 |
| JP | 2007-143235 | 6/2007 |
| JP | 2007-215394 | 8/2007 |
| JP | 2008-289292 | 11/2008 |

OTHER PUBLICATIONS

Japanese Office Action dated Sep. 14, 2010 issued in corresponding Japanese Application No. 2008-303627 with English Translation.

* cited by examiner

*Primary Examiner* — Paul Ip
(74) *Attorney, Agent, or Firm* — Nixon & Vanderhye PC

(57) ABSTRACT

A control device has a unit for determining a controlled phase of a controlled voltage outputted from an inverter to a generator according to a difference between a target torque and an estimated torque of the generator, a unit for calculating an instructed vector norm of the controlled voltage from the target torque, an electrical angular speed of the generator and parameters indicating characteristics of the generator, a unit for correcting the instructed norm to an adjusted vector norm such that a phase of current flowing through the generator in response to the controlled voltage set at the controlled phase and the adjusted norm is controlled to a phase of an instructed current determined from the target torque, and a unit for controlling the generator by controlling the inverter to output the controlled voltage set at the controlled phase and the adjusted norm to the generator.

15 Claims, 11 Drawing Sheets

VOLTAGE
UTILIZATION
RATIO Vn/VDC   0.78

0.71

BL1: $\dfrac{\partial T(Vn1, \delta, \omega)}{\partial \delta} > 0$

BL2: $Id(Vn1, \delta, \omega) \leq 0$

BL3: $Iq(Vn1, \delta, \omega) \geq 0$

BL4: $Vn1 \leq 0.78 \cdot VDC$

CONTROL DEVICE AND CONTROL SYSTEM FOR ELECTRIC ROTATING MACHINE

CROSS-REFERENCE TO RELATED APPLICATION

This application is based upon and claims the benefit of priority of the prior Japanese Patent Application 2008-303627 filed on Nov. 28, 2008, so that the contents of which are incorporated herein by reference.

BACKGROUND OF THE INVENTION

1. Field of the Invention

The present invention relates to a control device which controls a torque generated in an electric rotating machine by controlling a voltage outputted from a power inverter circuit to the machine, and also relates to a control system having the control device and the power inverter circuit.

2. Description of Related Art

A control device for a three-phase motor has been used. For example, to control three phase currents, actually flowing through respective phase windings of the motor, to instructed values under the feed-back control, this device performs a pulse width modulation (PWM) control for the motor. In this PWM control, instructed values of phase voltages outputted from an inverter to the phase windings of the motor are calculated, and switching elements of the inverter are operated based on the difference between the level of a predetermined carrier wave and the instructed level of the phase voltage. Therefore, the phase voltage applied to each phase winding can be controlled to the instructed value, so that the phase current flowing through each phase winding can be controlled to a desired value.

However, when the motor is set in a high rotation speed region so as to generate a high torque at a high rotation speed, the amplitude of the instructed phase voltage is increased so as to be equal to or higher than a half of an input voltage of the inverter. Therefore, in the high rotation speed region of the motor, it is difficult to control the voltage, actually outputted from the inverter, to the instructed value under the PWM control.

To perform the control for the motor in the high rotation speed region, the rectangular wave control has been used in place of the PWM control. In this rectangular wave control, the on-off cycle of each switching element of the inverter is set to be substantially the same as the rotation cycle of the motor expressed by electrical angle. The on-off cycle is defined as the reciprocal number of the on-off repetition frequency. However, the ratio (hereinafter, called voltage utilization ratio) of a controlled voltage outputted from the inverter to a voltage inputted to the inverter becomes large in the rectangular wave control, as compared with the maximum voltage utilization ratio of 1/2 in the PWM control. The voltage utilization ratio in the PWM control is maximized when the amplitude of the instructed voltage becomes 1/2 of the voltage inputted to the inverter.

Therefore, when one of the PWM control and the rectangular wave control is switched to the other one in response to a change of the torque required of the motor, the voltage utilization ratio is discontinuously changed. In this case, the torque generated in the motor becomes unstable due to this discontinuous change.

To continuously change the voltage utilization ratio even when the operation of the motor is shifted to the high rotation speed region, Published Japanese Patent First Publication No. H09-047100 discloses a control device for a motor. In this device, d- and q-axis components of an instructed voltage defined on the dq rotational coordinate system are calculated from an instructed current, determined based on a target torque, for the current feed-back control. When the amplitude of the controlled voltage outputted from an inverter to a three-phase motor is equal to or higher than a half of the voltage inputted to the inverter, the inverter is operated according to either a phase of the controlled voltage, calculated from the instructed voltage, or one of pulse patterns of a voltage signal stored in a read only memory (ROM). Each pulse pattern is formed to be appropriate to one value of the voltage utilization ratio. In other words, when the vector norm (i.e., vector length) of the instructed voltage is equal to or higher than a predetermined value, the inverter is operated according to the pulse pattern of the ROM corresponding to the vector norm. Therefore, the voltage utilization ratio in the control based on the pulse patterns of the ROM can be increased so as to approach the value obtained in the rectangular wave control.

The pulse pattern of the ROM is designed according to a motor model in which a motor is typically designed by adjusting parameters specifying characteristics of the motor. However, the performance of one motor actually manufactured differs from that of another motor, so that the pulse pattern of the ROM is not appropriate to all motors actually manufactured. Further, even when the pulse pattern is appropriate to one motor actually manufactured, the performance of this motor is changed with time due to aging. Moreover, the control device performs a maximum torque control for the motor to which the voltage based on the pulse pattern is applied. In this maximum torque control, the maximum torque can be generated in the motor by supplying the minimum current to the motor. In this case, even when the pulse pattern of the ROM is designed so as to be appropriate to the maximum torque control, the device cannot sometimes perform the maximum torque control for the motor.

For example, the control device selects the control based on the pulse pattern of the ROM or the control based on the voltage phase in the PWM control to perform the maximum torque control under the selected control. When the control selection is changed, the output voltage of the inverter according to the control of the pulse pattern of the ROM is differentiated from the output voltage of the inverter according to the control of the voltage phase in the PWM control. Therefore, each time the selection of the control based on the pulse pattern of the ROM or the control based on the voltage phase in the PWM control is switched to another one, the output voltage of the inverter is discontinuously changed, and the controllability in the control of the motor is lowered.

SUMMARY OF THE INVENTION

An object of the present invention is to provide, with due consideration to the drawbacks of the conventional control device, a control device which controls the torque, generated in an electric rotating machine from a controlled voltage outputted from a power inverter circuit, at a high controllability while adjusting the phase of the output voltage.

Another object of the present invention is to provide a control system having the control device and the power inverter circuit.

According to a first aspect of this invention, the object is achieved by the provision of a control device for controlling a multi-phase electric rotating machine by controlling a power inverter circuit to output a controlled voltage of a multi-phase current to the machine. The control device comprises a phase determining unit, a norm calculating unit, a norm correcting unit, and a torque feed-back control unit. The phase determining unit determines a phase of the controlled voltage at a controlled phase to control an operating torque, generated in the machine from the controlled voltage set at the controlled phase, to a target torque under a torque feed-back control. The norm calculating unit calculates an instructed vector norm of the controlled voltage while using a parameter indicating a characteristic of the machine to control a current, flowing through the machine in response to the controlled voltage set at the instructed vector norm and the controlled phase, to an instructed current corresponding to the target torque under an open-loop control. The norm correcting unit corrects the instructed vector norm of the norm calculating unit to an adjusted vector norm to control an operating current, flowing through the machine in response to the controlled voltage set at the adjusted vector norm and the controlled phase, to the instructed current under a feed-back control. The torque feed-back control unit controls the machine to generate the target torque in response to the controlled voltage, set at the controlled phase of the phase determining unit and the adjusted vector norm of the norm correcting unit, under the torque feed-back control.

With this structure of the control device, assuming that the device has no correcting unit, the controlled voltage is set at the controlled phase and the instructed vector norm according to the target torque, the operating torque actually generated in the electric rotating machine and the parameter, and this controlled voltage is applied from the power inverter circuit to the machine to generate the target torque from the controlled voltage in the machine. That is, the control device performs a torque feed-back control to control the torque of the machine to the target torque. However, when an actual value of the parameter is differentiated from a designed value, the operating current, flowing through the machine in response to the controlled voltage, is shifted from the instructed current corresponding to the target torque. In this case, when the control device changes the torque feed-back control to a current feed-back control, in which the phase of the controlled voltage is adjusted under the pulse width modulation (PWM) control such that the operating current is controlled to the instructed current, in response to a change in the target torque, there is a high probability that the control voltage of the circuit is considerably fluctuated. Therefore, the controllability in the control of the machine is undesirably lowered.

In contrast, in this invention, the correcting unit corrects the instructed vector norm to a adjusted vector norm according to the operating and instructed currents such that the operating current is controlled to the instructed current under the feed-back control. Therefore, during the torque feed-back control, the operating current is controlled to the instructed current. In this case, when the control device changes the torque feed-back control to the current feed-back control, the control voltage of the circuit is smoothly changed without any rapid change.

Accordingly, the control device can control the torque, generated from the controlled voltage in the machine, at a high controllability while adjusting the phase of the controlled voltage.

According to the second aspect of this invention, the object is achieved by the provision of a control system comprising the control device and the power inverter circuit controlled by the control device.

Accordingly, the control system can control the torque, generated from the controlled voltage in the machine, at a high controllability while adjusting the phase of the controlled voltage.

DETAILED DESCRIPTION OF THE PREFERRED EMBODIMENTS

Figure 1:
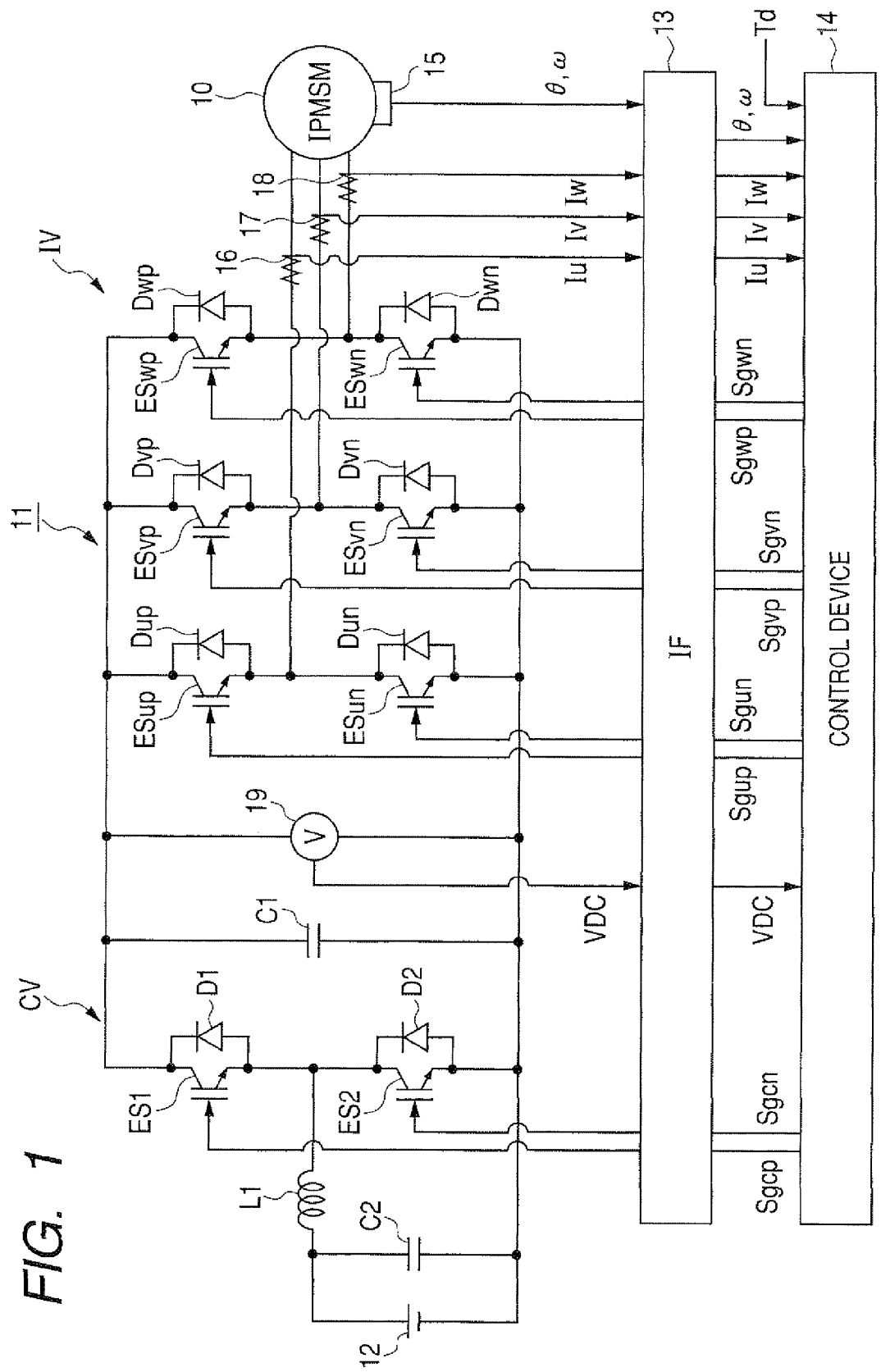
FIG. 1 is a view showing the structure of a control system for a motor generator according to the first embodiment of the present invention.

Embodiments of the present invention will now be described with reference to the accompanying drawings, in which like reference numerals indicate like parts, members or elements throughout the specification unless otherwise indicated.

First Embodiment

FIG. 1 is a view showing the structure of a control system for a motor generator according to the first embodiment.

As shown in FIG. 1, electric power of a high-voltage battery 12 is supplied to a motor generator 10 through a control system 11. This power generating system including the generator 10, the system 11 and the battery 12 is, for example, mounted on a hybrid vehicle. The generator 10 represents an electric rotating machine whose feature is the presence of magnetic saliency. More specifically, the generator 10 is a three-phase interior permanent magnet synchronous motor (IPMSM). This motor has a rotor, permanent magnets having salient poles and being disposed around a shaft of the rotor so as to be protruded from the shaft, a stator surrounding the rotor, and three windings (i.e., a u-phase winding, a v-phase winding and a w-phase winding) wound on the stator.

The control system 11 has a boost converter CV for boosting the voltage (e.g., 288V) of the battery 12 to a supply voltage VDC of a direct current, and an inverter IV, representing a power inverter circuit, for producing a controlled voltage Vc from the supply voltage VDC and supplying a three-phase electric current (a u-phase current Iu, a v-phase current Iv and a w-phase current Iw defined in the uvw coordinate system) set at the controlled voltage Vc to the generator 10. The control system 11 further has a voltage sensor 19 for detecting the supply voltage VDC, a capacitor C1 for smoothing fluctuations of the supply voltage VDC, current sensors 16, 17 and 18 for detecting the phase currents Iu, Iv and Iq set at the controlled voltage Vc and supplied to the generator 10, a rotational angle sensor 15 for detecting a rotational angle θ of the rotor of the generator 10 rotated in response to the supplied phase currents, an interface 13, and a control device 14.

The control device 14 is a low voltage system to be operated by a low voltage. The device 14 receives information of the supply voltage VDC, information of the phase currents Iu, Iv and Iw and information of the rotational angle θ from the sensors 15 to 19 through the interface 13. The device 14 produces control signals (or actuating signals) Scp, Scn, Sgcp, Sgcn, Sgup, Sgun, Sgvp, Sgvn, Sgwp and Sgwn from the received information and information of a target torque Td. The device 14 controls the converter CV to output the supply voltage VDC according to the control signals Scp and Scn. The device 14 controls the inverter IV to convert the supply voltage VDC into the controlled voltage Vc, having a target amplitude and a controlled phase, according to the control signals Sgcp, Sgcn, Sgup, Sgun, Sgvp, Sgvn, Sgwp and Sgwn. Therefore, the device 14 controls the torque (i.e., controlled variable), generated in the generator 10 from the controlled voltage Vc, to the target torque Td.

The supply voltage VDC is set at 666V or less under control of the device 14. The rotational angle θ is expressed by electrical angle. A voltage utilization ratio is defined as the ratio of the controlled voltage Vc to the supply voltage VDC. The target torque Td is determined according to operating conditions of the vehicle.

The inverter IV has u-phase switching elements ESup and ESun serially connected with each other, v-phase switching elements ESvp and ESvn serially connected with each other, w-phase switching elements ESwp and Swn serially connected with each other, and diodes Dup, Dun, Dvp, Dvn, Dwp and Dwn connected with the respective switching elements in parallel. Each switching element is made of an n-p-n insulated-gate bipolar transistor (IGBT). The emitters of the switching elements ESup, ESvp and ESwp are connected with the collectors of the respective switching elements ESun, ESvn and ESwn. The collectors of the switching elements ESup, ESvp and ESwp are connected with the higher voltage terminal of the converter CV, while the emitters of the switching elements ESun, ESvn and ESwn are connected with the lower voltage terminal of the converter CV. The anode of each diode is connected with the emitter of the corresponding switching element. The connecting point of the elements ESup and ESun is connected with the u-phase stator winding of the generator 10, and the sensor 16 detects the u-phase current Iu of the winding and outputs information of the u-phase current Iu. The connecting point of the elements ESvp and ESvn is connected with the v-phase stator winding of the generator 10, and the sensor 17 detects the v-phase current Iv of the winding and outputs information of the v-phase current Iv. The connecting point of the elements ESwp and ESwn is connected with the w-phase stator winding of the generator 10, and the sensor 18 detects the w-phase current Iw of the winding and outputs information of the w-phase current Iw. The u-phase current Iu flows along a u-phase axis, the v-phase current Iv flows along a v-phase axis, and the w-phase current Iw flows along a w-phase axis.

As is well known, the converter CV has two switching elements ES1 and ES2 serially connected with each other, two diodes D1 and D2 connected with the respective switching elements, a capacitor C2 and an inductor L1.

The control device 14 sends the control signals Sgcp and Sgcn to bases of the switching elements of the converter CV, sends the control signals Sgup and Sgun to bases of the respective switching elements ESup and Esun, sends the control signals Sgvp and Sgvn to bases of the respective switching elements ESvp and Esvn, and sends the control signals Sgwp and Sgwn to bases of the respective switching elements ESwp and Eswn.

Figure 2:
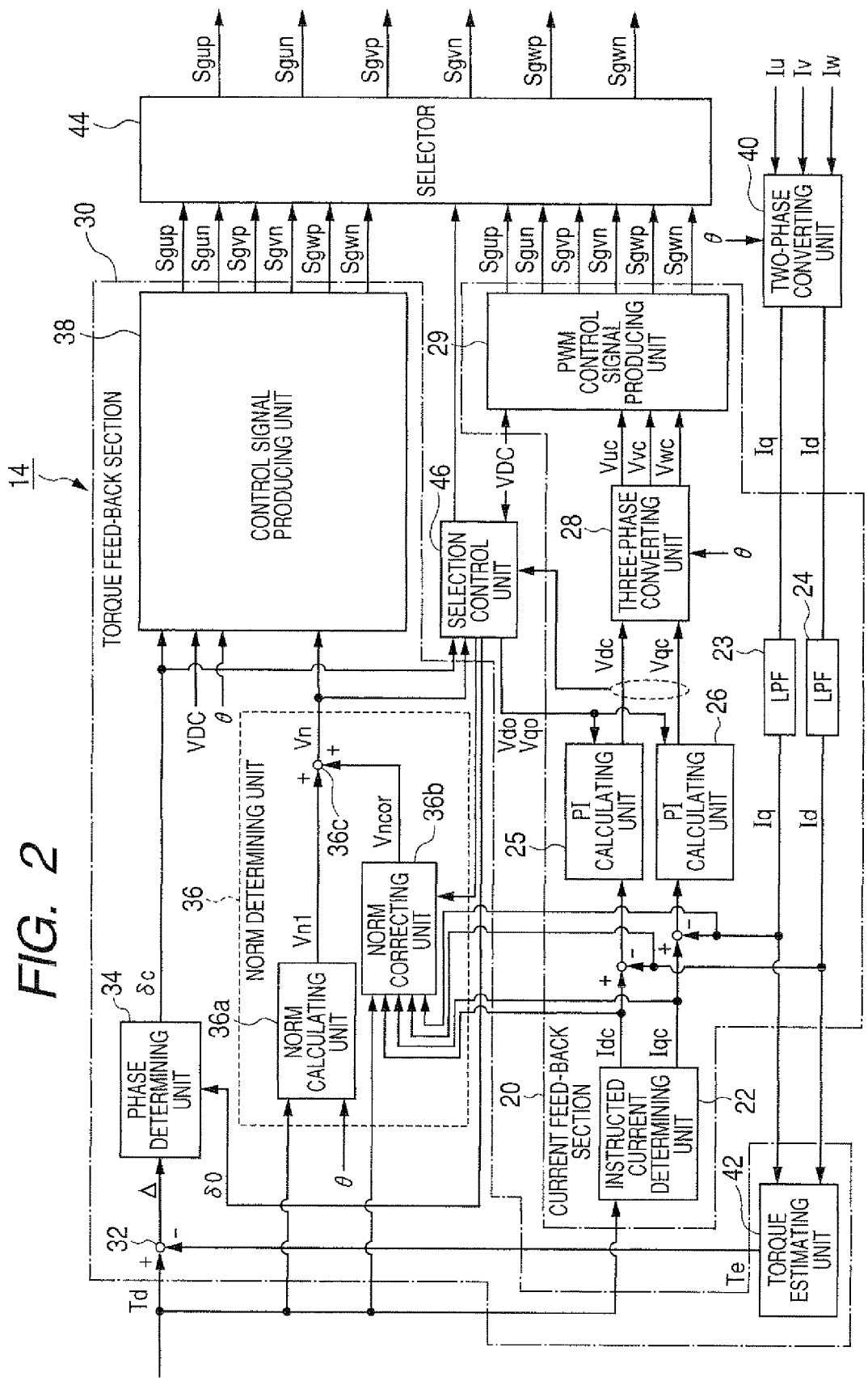
FIG. 2 is a block diagram of a control device arranged in the control system shown in FIG. 1.

FIG. 2 is a block diagram of a portion of the control device 14 producing control signals sent to the inverter IV. As shown in FIG. 2, the device 14 has a two-phase converting unit 40 for converting the u-, v- and w-phase currents Iu, Iv and Iw into a d-axis component Id of the actual current (hereinafter, called a d-axis actual current Id) and a q-axis component Iq of the actual current (hereinafter, called a q-axis actual current Iq) while considering the rotational angle θ and producing a signal Sid' indicating the d-axis actual current Id and a signal Siq' indicating the q-axis actual current Iq. The d-axis component Id of the actual current flows along a d-axis, and the q-axis component Iq of the actual current flows along a q-axis.

The d-axis and the q-axis are defined on a two-phase dq rotational coordinate system rotated with the rotor. The d-axis is set so as to be directed from one S magnetic pole to the corresponding N magnetic pole in the rotor. The q-axis is set to be orthogonal to the d-axis on a plane perpendicular to the rotation axis of the rotor. An original point of this coordinate system is placed on the rotation axis. The u-, v-, and w-phase axes are defined on the uvw coordinate system. The three axes of the uvw coordinate system are spaced at equal intervals of 120 degrees in electrical angle on the plane perpendicular to the rotation axis, and an original point of the uvw coordinate system is set on the rotation axis of the rotor to be the same position as that of the two-phase rotational coordinate system.

The device 14 further has a current feed-back control section 20 for performing a current feed-back control according to information of a target torque Td and information of the d- and q-axis components Id' and Iq' of the actual current to produce control signals Sgup, Sgun, Sgvp, Sgvn, Sgwp and Sgwn, a torque feed-back control section 30 for performing a torque feed-back control according to information of the target torque Td and information of the actual current to produce other control signals Sgup, Sgun, Sgvp, Sgvn, Sgwp and Sgwn, a selection control unit 46 for selecting the current feed-back control of the section 20 when the generator 10 is operated at a low voltage utilization ratio and selecting the torque feed-back control of the section 30 when the generator 10 is operated at a high voltage utilization ratio, and a selector 44 for selecting the control signals produced in the section 20 or 30 according to the selection of the unit 46 and sending the selected control signals to the inverter IV.

The section 20 has a low pass filter 24 for removing noise included as high-frequency components in the signal Sid' indicating the d-axis actual current Id to produce a signal Sid indicating the d-axis actual current Id, a low pass filter 23 for removing noise included as high-frequency components in the signal Siq' indicating the q-axis actual current Iq to produce a signal Siq indicating the q-axis actual current Iq, an instructed current determining unit 22 for determining both a d-axis component Idc of an instructed current (hereinafter, called a d-axis instructed current Idc) flowing along the d-axis and a q-axis component Iqc of the instructed current (hereinafter, called an instructed q-axis current Iqc) flowing along the q-axis from information of the target torque Td, a d-axis PI calculating unit 25 for performing the proportional and integral calculation for the difference between the d-axis instructed current Idc and the d-axis actual current Id to calculate a d-axis component Vdc of an instructed voltage (hereinafter, called a d-axis instructed voltage Vdc) as a controlled value such that the current Id is controlled to the current Idc under the current feed-back control when the instructed d-axis voltage Vdc is applied from the inverter IV to the generator 10, a q-axis PI calculating unit 26 for performing the proportional and integral calculation for the difference between the q-axis instructed current Iqc and the q-axis actual current Iq to calculate a q-axis component Vqc of the instructed voltage (hereinafter, called a q-axis instructed voltage Vqc) as a controlled value such that the current Iq is controlled to the current Iqc under the current feed-back control when the q-axis instructed voltage Vqc is applied to the generator 10, a three-phase converting unit 28 for converting the instructed d-axis voltage Vdc and the instructed q-axis voltage Vqc defined in the two-phase coordinate system into a u-axis instructed voltage Vuc, a v-axis instructed voltage Vvc and a w-axis instructed voltage Vwc while considering the rotational angle θ, and a PWM control signal producing unit 29 for performing a well-known PWM process to produce control signals Sgup, Sgun, Sgvp, Sgvn, Sgwp and Sgwn from information of the voltages Vuc, Vvc and Vwc and information of the supply voltage VDC. In this PWM process, the u-, v- and w-axis instructed voltages formed in the sine wave are two-phase modulated to two modulated voltage signals, and these modulated voltage signals are normalized by the supply voltage VDC. Then, as shown in FIG. 3B, each normalized signal is compared with a carrier signal having pulses formed in a triangular shape. During the first period of time at which the level of the normalized signal is higher than the level of the carrier signal, a voltage pattern signal is set in the high level. The voltage pattern signal is set in the low level during the other period of time. Then, the control signals are produced from the voltage pattern signals.

The section 30 has a torque estimating unit 42 for estimating the torque Te actually generated in the generator 10 from the signals Sid and Siq of the d- and q-axis actual currents Id and Iq, a difference calculating unit 32 for calculating the difference Δ(=Td−Te) between the target torque Td and the estimated torque Te, and a phase determining unit 34 for performing a proportional and integral calculation for the difference Δ to determine a controlled phase δc of the controlled voltage Vc from the difference Δ such that the torque actually generated in the generator 10 is controlled to the target torque Td under the torque feed-back control. The phase of the controlled voltage Vc is defined on the two-phase rotational coordinate system.

In the unit 34, the controlled phase δc is calculated as a control variable of the controlled voltage Vc. When the difference Δ is negative (Td<Te) the phase δ of the controlled voltage Vc actually applied to the generator 10 is controlled to the controlled phase δc so as to be retarded. In contrast, when the difference Δ is positive (Td>Te), the phase δ of the controlled voltage Vc is controlled to the controlled phase δc so as to be advanced.

The section 30 further has a norm determining unit 36 for determining an adjusted vector norm Vn of the controlled voltage Vc defined on the two-phase rotational coordinate system. The vector norm of the controlled voltage Vc expressed by a d-axis component Vd and a q-axis component Vq is defined as the square root of the sum $Vd^2+Vq^2$ of the d-axis component squared and the q-axis component squared.

The unit 36 has a norm calculating unit 36a for storing parameters specifying characteristics of the generator 10, calculating an electrical angular speed (i.e., a rotational speed) ω of the rotor of the generator 10 from the rotational angle θ, and calculating an instructed vector norm Vn1 of the controlled voltage Vc, defined on the two-phase rotational coordinate system, from the electrical angular speed ω, the target torque Td and the stored parameters. The parameters are, for example, the number of armature winding linkage magnetic fluxes Φ, a d-axis inductance Ld, a q-axis inductance Lq, a resistance R of an armature winding, and the number of pole pairs P. In response to the controlled voltage Vc set at the instructed vector norm Vn1 and the controlled phase δc, a current flowing through the generator 10 is controlled to an instructed current corresponding to the target torque Td under an open-loop control. However, when actual values of the parameters differ from designed values, a current flowing through the generator 10 is not correctly controlled to the instructed current under the open-loop control. Therefore, it is required to correct the vector norm of the controlled voltage Vc.

The unit 36 further has a norm correction calculating unit 36b for calculating a norm correction Vncor from the value of the target torque Td, the values of the d- and q-axis instructed currents Idc and Iqc and the values of the d- and q-axis actual currents Id and Iq, and an adder 36c for calculating the sum of the instructed norm Vn1 and the norm correction Vncor as an adjusted vector norm Vn. In response to the controlled voltage Vc set at the controlled phase δc and the adjusted vector norm Vn, d- and q-axis operating currents, actually flowing through the generator 10, are controlled to the instructed currents Idc and Iqc under a current feed-back control.

The section 30 further has a control signal producing unit 38 for storing a map of a controlled voltage waveform as map data for each of a plurality of values of the voltage utilization ratio, calculating a value Vn/VDC of the ratio from the adjusted vector norm Vn and the supply voltage VDC, selecting map data of the ratio corresponding to the calculated value, specifying the controlled voltage waveform corresponding to the selected map data, and producing control signals Sgup, Sgun, Sgvp, Sgvn, Sgwp and Sgwn while adjusting the output timing of the control signals according to the controlled phase δc and the rotational angle θ of the rotor so as to match the electrical angle of the map data with that of the rotor. The switching elements of the inverter IV are operated according to the control signals so as to output a voltage signal having the specified controlled voltage waveform.

Figure 3A:
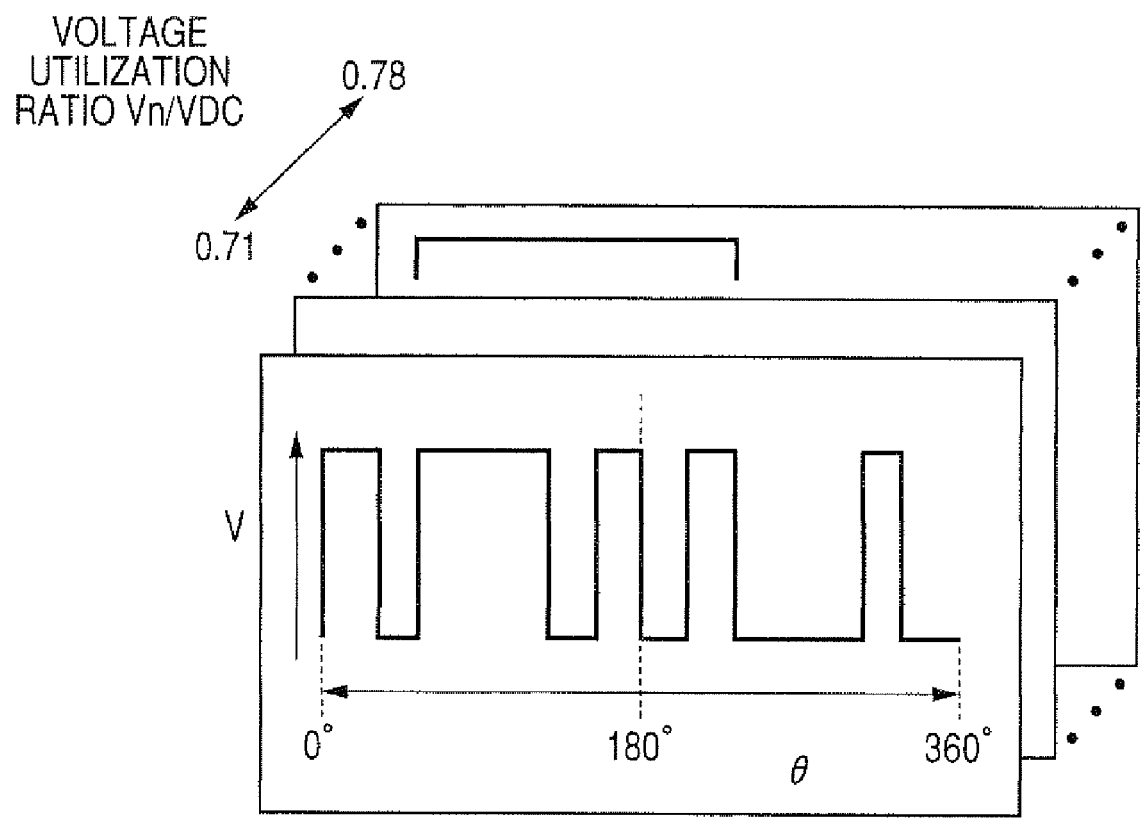
FIG. 3A is a view showing an example of the controlled voltage waveform stored in a control signal producing unit shown in FIG. 2.
Figure 3B:
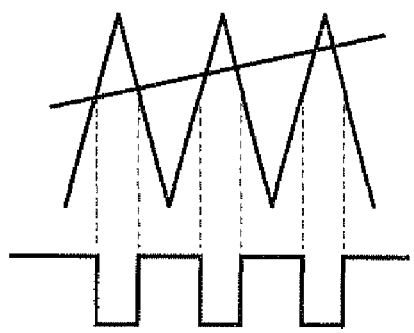
FIG. 3B is a view showing the process in a PWM signal producing unit shown in FIG. 2.

FIG. 3A shows an example of the controlled voltage waveform stored in the unit 38. As shown in FIG. 3A, the voltage utilization ratio is ranged from 0.71 to 0.78 in the toque feed-back control of the section 30. Each controlled voltage waveform corresponding to one value of the voltage utilization ratio is formed in one rotation cycle (i.e., 2π radians or 360 degrees expressed by electrical angle) of the rotor such that the controlled voltage Vc has a waveform similar to the sine waveform in each rotation cycle. More specifically, in the controlled voltage waveform, the sum of periods set at the high voltage (logic H) is set to be equal to the sum of periods set at the low voltage (logic L) in one rotation cycle. The high voltage is equal to the product of the supply voltage VDC and the value of the voltage utilization ratio. The low voltage is set at zero. Therefore, when the controlled voltage Vc of the inverter IV has this waveform, the controlled voltage Vc is balanced every rotation cycle. Further, the waveform is set to be anti-symmetric with respect to the center (i.e., 180 degrees) of the rotation cycle. That is, the logic of the voltage level at the electrical angle Ae (0≦Ae<180 degrees) is differentiated from the logic at the electrical angle of 360-Ae degrees, and the logic is changed at the electrical angle of 180 degrees. Each of the waveforms other than the waveform corresponding to the ratio set at 0.78 has a plurality of pulses. As the ratio is decreased, the number of pulses in the controlled voltage waveform is increased. For example, the number of pulses in the waveform corresponding to the ratio set at 0.71 has five pulses.

In response to the logic H of the waveform, the switching elements ESup, ESvp and ESwp of the high voltage side are set in the on state, and the switching elements ESun, ESvn and ESwn of the low voltage side are set in the off state. Therefore, the controlled voltage Vc is set at the high level. In contrast, in response to the logic L of the waveform, the switching elements ESun, ESvn and ESwn are set in the on state, and the switching elements ESup, ESvp and ESwp are set in the off state. Therefore, the controlled voltage Vc is set at the low level, and the controlled voltage Vc is formed similar to the sine wave shape.

The highest value of the ratio in the section 30 is set at 0.78 which is equal to the value of the voltage utilization ratio in the rectangular wave control. The controlled voltage waveform corresponding to the highest ratio of 0.78 is formed in the same manner as that in the rectangular wave control so as to have only one pulse set at the high level in the angular range from 0 to 180 degrees. Therefore, when the ratio Vn/VDC is equal to 0.78, the waveform corresponding to the voltage utilization ratio of 0.78 is selected, the switching elements ESup, ESvp and Eswp are set in the on state during the period from 0 to 180 degrees, and the switching elements ESun, ESvn and ESwn are set in the on state during the period from 180 to 360 degrees. The controlled voltage Vc has only one pulse every rotation cycle. In contrast, the upper limit of the voltage utilization ratio, at which three u-, v- and w-phase voltages corresponding to the instructed voltages Vuc, Vvc and Vwc calculated in the current feed-back control section 20 are produced from the supply voltage VDC in the inverter IV, is equal to 0.71. Therefore, the lowest value of the voltage utilization ratio in the section 30 is set at 0.71.

The operation of the instructed current setting unit 22 of the section 20 will be described. The unit 22 sets the d-axis instructed current Idc and the q-axis instructed current Iqc from the target torque Td.

The torque T generated in the generator 10 is generally expressed by using the electric current (Id, Iq) actually flowing through the generator 10:

$$T = P\{\Phi Iq + (Ld-Lq)IdIq\} \quad (c1)$$

where Φ is the number of armature winding linkage magnetic fluxes, Ld is a d-axis inductance along the d-axis, Lq is a q-axis inductance along the q-axis, P is the number of magnetic pole pairs. Because permanent magnets of the generator 10 have salient poles, the d-axis inductance Ld is smaller than the q-axis inductance Lq.

Figure 4:
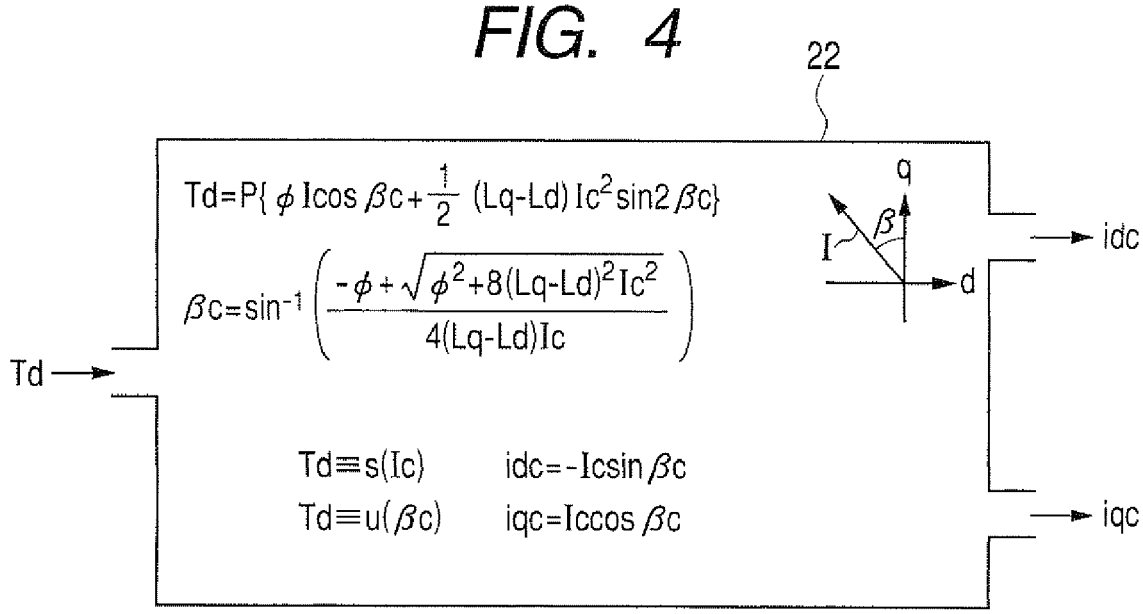
FIG. 4 is a view showing the process performed in an instructed current setting unit of the control device shown in FIG. 2.

FIG. 4 is a view showing the process performed in the unit 22. As shown in FIG. 4, the current (Id, Iq) is generally expressed by (−I sin β, I cos β) by using the amplitude I and the phase β of the current. The phase β is defined as an angle from the positive-directional q-axis to the current vector along the anticlockwise direction on the two-phase rotational coordinate system. The equation (c1) is rewritten as follows:

$$T = P\{\Phi I \cos\beta + 1/2 \times (Ld-Lq)I^2 \sin 2\beta\} \quad (c2)$$

by using Id=−I sin β and Iq=I cos β. The amplitude I and the phase β are variables.

The unit 22 determines the instructed d- and q-axis currents from the target torque so as to perform the maximum torque control based on these currents for the generator 10. In this maximum torque control, the generator 10 generates a maximum torque by receiving a minimum current from the inverter IV under control of the control device 14. When the generator 10 is operated under the power running control, the maximum torque has a positive value. In contrast, when the vehicle having the generator 10 is run under the regenerative braking control, the maximum torque is expressed by a negative value, and the absolute value of this torque is maximized in the maximum torque control.

Because of the maximum torque control, the partial differential of the torque T with respect to the phase β becomes zero (∂T/∂β=0). Therefore, when the condition of the maximum torque control is imposed on the torque T, the equation (c2) is rewritten as follows:

$$\beta = \sin^{-1}\left(\frac{-\Phi + \sqrt{\Phi^2 + 8(Lq-Ld)^2 I^2}}{4(Lq-Ld)I}\right). \quad (c3)$$

This equation (3) indicates that the phase β is a function of the current amplitude I. Therefore, when the phase is eliminated from the equations (2) and (c3), the torque T can be expressed by the function s(I) including only the variable of the current amplitude I (T=s(I)). Further, the equation (3) indicates that the amplitude I can be expressed only by the variable of the phase β. Therefore, when the amplitude I is eliminated from the equations (2) and (c3), the torque T can be expressed by the function u(β) of only the phase β (T=u(β)). From the relation T=s(I), the amplitude I can be expressed by the function S including only the variable of the torque T, so that the relation I=S(T) can be obtained. From the relation T=u(β), the phase β can be expressed by the function U including only the variable of the torque T, so that the relation β=U(T) can be obtained. Therefore, when the unit 22 determines the instructed d-current Idc=−Ic sin βc and the instructed q-axis current Iqc=Ic cos βc from the target torque Td, the currents Idc and Iqc can be expressed by Idc=−S(Td) sin U(Td) and Iqc=S(Td)cos U(Td) by using the relations Ic=S(Td) and βc=U(Td).

The torque feed-back control section 30 shown in FIG. 2 sets the adjusted vector norm Vn of the controlled voltage Vc according to the target torque Td and the electrical angular speed ω of the rotor. Therefore, when the target torque Td is given to the section 30, the norm Vn is not determined at one value, but can be comparatively freely set. In this case, when the norm Vn is set as low as possible, the voltage utilization ratio can be lowered. As this ratio is lowered, the number of pulses in the controlled voltage waveform selected in the unit 38 is increased. As the number of pulses in the waveform is increased, the controlled voltage Vc outputted from the inverter IV can approach the sinusoidal waveform so as to reduce harmonic distortion of the controlled voltage Vc (i.e., higher harmonic waves existing in the controlled voltage Vc as distortion), and current based on higher harmonic waves of the controlled voltage Vc can be suppressed.

Figure 5:
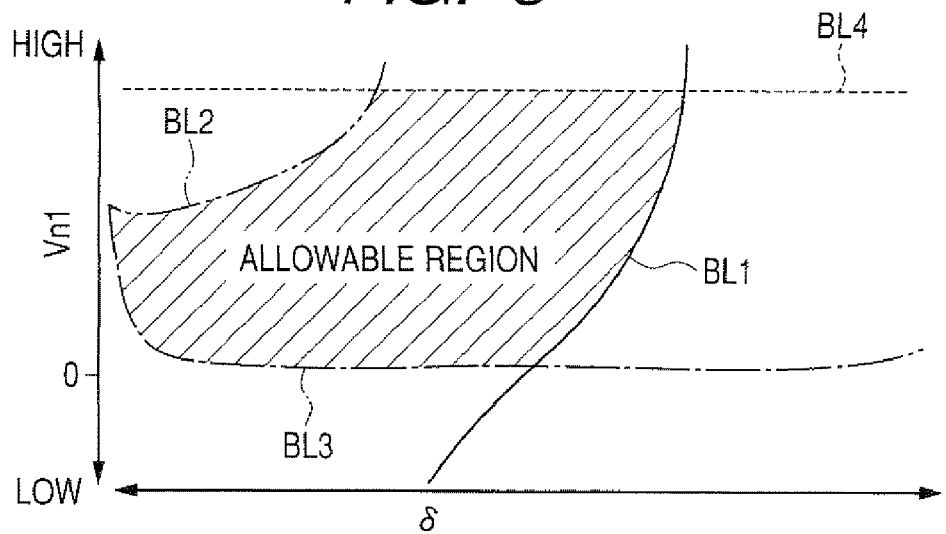
FIG. 5 is a view showing an allowable region of a voltage vector norm set in a norm calculating unit of the control device shown in FIG. 2.

The setting of the instructed norm Vn1 in the norm calculating unit 36a will be described. FIG. 5 is a view showing an allowable region of the instructed norm Vn1.

As shown in FIG. 5, when the generator 10 is operated under the power running control, the instructed norm Vn1 is limited in an allowable region surrounded by four boundary lines BL1, BL2, BL3 and BL4. The boundary line BL4 is determined based on the fourth condition that the voltage utilization ratio in the torque feed-back control of the section 30 is equal to or lower than the maximum value (i.e., 0.78) of the ratio in the rectangular wave control (Vn1≦0.78VDC). The line BL4 corresponds to the ratio of 0.78.

Before the explanation of the lines BL1 to BL3, the current vector (Id, Iq) actually flowing through the generator 10 and the torque T actually generated in the generator 10 will be derived from the voltage equation.

The voltage equation expressing the vector (Vd, Vq) of the controlled voltage Vc by using the current vector (Id, Iq) and the electrical angular speed ω is as follows:

$$\begin{bmatrix} Vd \\ Vq \end{bmatrix} = \begin{bmatrix} R & -\omega*Lq \\ \omega*Ld & R \end{bmatrix}\begin{bmatrix} Id \\ Iq \end{bmatrix} + \begin{bmatrix} 0 \\ \omega*\Phi \end{bmatrix} \quad (c4)$$

where R is resistance of the stator.

By rearranging the equation (c4), the current components Id and Iq are expressed by voltage components Vd and Vq as follows:

$$\begin{bmatrix} Id \\ Iq \end{bmatrix} = \frac{1}{R^2 + \omega^2*Ld*Lq}\begin{bmatrix} R & \omega*Lq \\ -\omega*Ld & R \end{bmatrix}\begin{bmatrix} Vd \\ Vq - \omega*\Phi \end{bmatrix}. \quad (c5)$$

By eliminating the current components Id and Iq from the equations (c1) and (c5), the torque T can be expressed by the vector norm and phase of voltage as follows.

$$T(Vn1, \delta) = \frac{P\sqrt{R^2 + \omega^2*Ld^2}}{(R^2 + \omega^2*Ld*Lq)^2} \quad (c6)$$

$$\{Vn1\sin(\delta + \theta 1) - \omega\Phi\sin\theta 1\} * \left[\Phi R^2 + \omega^2*Ld*Lq + (Ld - Lq)\sqrt{R^2 + \omega^2*Ld^2}\{Vn1\cos(\delta + \theta 2) - \omega\Phi\cos\theta 2\}\right]$$

To simply express the equation (c6), relations are used as follows.

$$Vd \equiv -Vn1\sin\delta, \text{ and } Vq \equiv Vn1\cos\delta$$

$$\sin\theta 1 \equiv \frac{R}{\sqrt{R^2 + \omega^2 Ld^2}},$$

$$\cos\theta 1 \equiv \frac{\omega Ld}{\sqrt{R^2 + \omega^2 Ld^2}},$$

$$\sin\theta 2 \equiv \frac{R}{\sqrt{R^2 + \omega^2 Lq^2}},$$

and $$\cos\theta 2 \equiv \frac{\omega Ld}{\sqrt{R^2 + \omega^2 Lq^2}}$$

When the target torque Td is larger than the estimated torque Te determined from the phase currents actually flowing through the stator of the generator 10, it is required to advance the phase δ of the voltage vector (Vd, Vq) for the purpose of increasing the torque T. In contrast, when the target torque Td is smaller than the estimated torque Te, it is required to retard the phase δ for the purpose of decreasing the torque T. That is, the first condition that the partial differential of the torque T with respect to the phase δ is positive (∂T/∂δ>0) is needed. The boundary line BL1 shown in FIG. 5 is determined based on this first condition.

When the first condition is applied on the equation (c6), relations (c7a) and (c7b) are obtained.

$$\text{if } 0 \leq \delta < \frac{1}{2}\left(\frac{\pi}{2} - \theta 1 - \theta 2\right) \quad (c7a)$$

$$Vn1 < \frac{\Phi(R^2 + \omega^2*Ld*Lq)\cos(\delta + \theta 1) + \omega\Phi(Ld - Lq)}{\sqrt{R^2 + \omega^2*Lq^2}\{\sin\theta 1\sin(\delta + \theta 2) - \cos\theta 2\cos(\delta + \theta 1)\}}{(Ld - Lq)\sqrt{R^2 + \omega^2*Lq^2}\cos(2\delta + \theta 1 + \theta 2)}$$

$$\text{if } \frac{1}{2}\left(\frac{\pi}{2} - \theta 1 - \theta 2\right) \leq \delta \leq \frac{1}{2}\left(\frac{3\pi}{2} - \theta 1 - \theta 2\right) \quad (c7b)$$

$$Vn1 > \frac{\Phi(R^2 + \omega^2*Ld*Lq)\cos(\delta + \theta 1) + \omega\Phi(Ld - Lq)}{\sqrt{R^2 + \omega^2*Lq^2}\{\sin\theta 1\sin(\delta + \theta 2) - \cos\theta 2\cos(\delta + \theta 1)\}}{(Ld - Lq)\sqrt{R^2 + \omega^2*Lq^2}\cos(2\delta + \theta 1 + \theta 2)}$$

In this embodiment, the control device 14 is designed such that the phase δ of the voltage vector is set in the range of 0≦δ<3π/2 during the operation of the generator 10 under the power running control, while the phase δ is set in the range of −3π/2<δ<0 under the regenerative braking control. Therefore, the norm Vn1 in case of δ≧3π/2 is not determined.

The boundary line BL2 shown in FIG. 5 is determined based on the second condition that the d-axis current Id is equal to or lower than zero (Id≦0). The relation (c8) is obtained from the relation Id≦0, the equation (c5) and the relation Vd=−Vn1 sin δ.

$$\text{if } 0 \leq \delta < \frac{\pi}{2} - \theta 2 \quad (c8)$$

$$Vn1 \leq \frac{\omega^2 Lq\Phi}{\sqrt{R^2 + \omega^2*Lq^2}\cos(\delta + \theta 2)}$$

$$\text{if } \frac{\pi}{2} - \theta 2 \leq \delta \leq \pi$$

$$Vn1 \geq 0$$

The boundary line BL3 shown in FIG. 5 is determined based on the third condition that the q-axis current Iq is equal to or higher than zero under the power running control (Iq≧0). The relation (c9) is obtained from the relation Iq≧0, the equation (c5) and the relation Vq=Vn1 cos δ.

$$Vn1 \geq \frac{\omega^2 R\Phi}{\sqrt{R^2 + \omega^2*Ld^2}\sin(\delta + \theta 1)} \quad (c9)$$

$$0 \leq \delta < \pi - \theta 1$$

Under the regenerative braking control, the torque feed-back control is performed such that the q-axis current Iq is equal to or lower than zero (Iq≦0). Therefore, this relation Iq≦0 under the regenerative braking control is added to the third condition.

As shown in FIG. 5, the instructed norm Vn1 is set in the allowable region. Therefore, even when the phase δ and the electrical angular speed ω are determined, the norm Vn1 cannot be determined to one value. That is, there is a certain degree of freedom in the setting of the norm Vn1, and the norm Vn1 can be freely set. To reduce or suppress harmonic distortion of the controlled voltage Vc outputted from the inverter IV, it is desired to set the norm Vn1 as low as possible. To set the norm Vn1 at its lowest value, for example, it is required to set the partial differential of the torque T with respect to the norm Vn1 is zero ($\partial T/\partial Vn1=0$). However, when the norm Vn1 is set in the allowable region, inventors of this specification found out that the one-to-one correspondence between the phase $\delta$ and the norm Vn1 is not obtained.

In this embodiment, the instructed norm Vn1 is set such that the maximum torque control is performed in the torque feed-back control of the control device 14 so as to obtain the maximum torque by supplying the minimum electric current to the generator 10.

Figure 6:
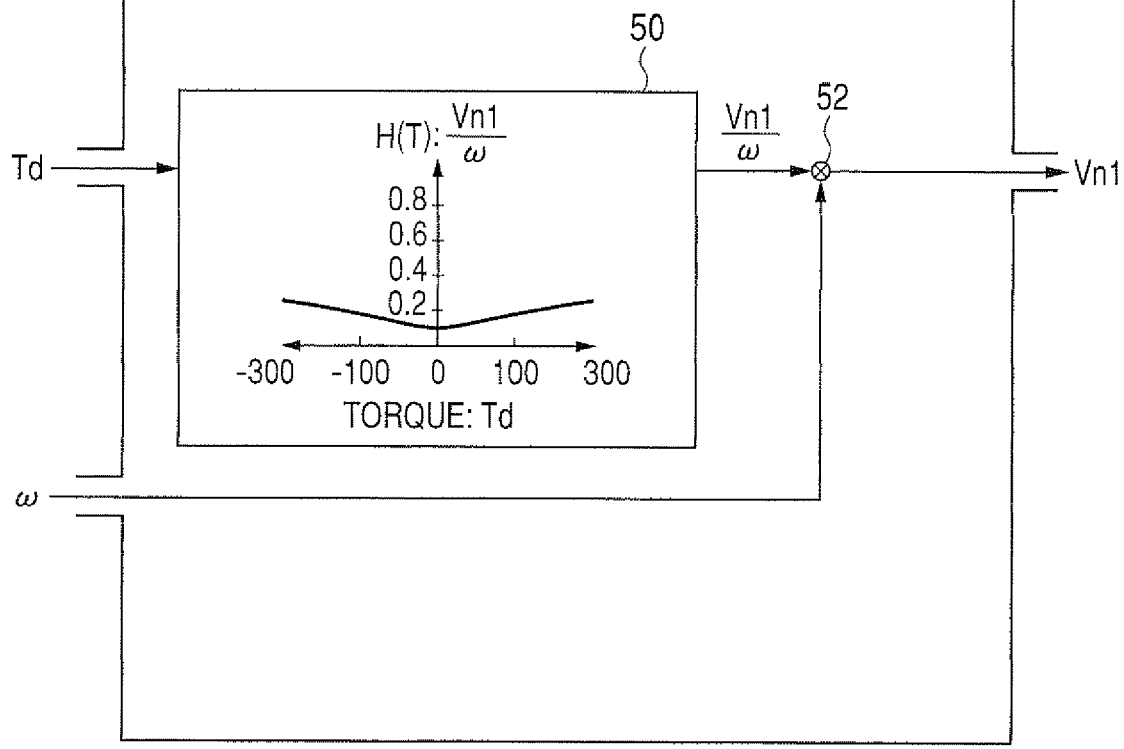
FIG. 6 is a view showing the operation performed in a norm calculating unit of the control device shown in FIG. 2.

FIG. 6 is a view showing the operation performed in the norm calculating unit 36a. As shown in FIG. 6, the relation between the d- and q-axis currents Id and Iq is required as expressed in the equation (c10) to perform the maximum torque control.

$$Id = \frac{\Phi}{2(Lq-Ld)} - \sqrt{\frac{\Phi^2}{4(Lq-Ld)^2} + Iq^2} \quad \text{(c10)}$$

This equation is, for example, described on "Design and Control of Interior Permanent Magnet Synchronous Motor", page 23, published by Ohmsha Ltd. By eliminating the current vector (Id, Iq) from the equations (c5) and (c10), the norm Vn1 can be expressed by the function of the phase $\delta$ and the electrical angular speed $\omega$ by using the relations Vd=−Vn1 sin $\delta$ and Vq=Vn1 cos $\delta$. Especially, because the angular speed $\omega$ is changed in a high value range in the torque feed-back control, relations $R^2+\omega^2 LdLq \approx \omega^2 LdLq$, $R \ll \omega Lq$ and $R \ll \omega Ld$ are obtained in the equation (c5). In this case, the equation (c5) can be simplified by disregarding the resistance R. Therefore, the norm Vn1 is expressed in the equation (c11).

$$Vn1 = \omega\Phi \frac{(2Lq-Ld)\cos\delta - \sqrt{\frac{4Ld^2(Lq-Ld)}{Lq}\sin^2\delta + Ld^2\cos^2\delta}}{2(Lq-Ld)\left\{\cos^2\delta - \frac{Ld^2}{Lq^2}\sin^2\delta\right\}} \quad \text{(c11)}$$

In this equation (c11), the norm Vn1 is expressed by the function of the phase $\delta$ and the angular speed $\omega$, so that the equation (c11) can be simply rewritten by Vn1$\approx\omega$f($\delta$). In this relation Vn1$\approx\omega$f($\delta$), the phase $\delta$ is an independent variable, and the norm Vn1 is a dependent variable normalized by the angular speed $\omega$ (i.e., speed normalized norm Vn1/$\omega$). The norm Vn1 is expressed by the product of the angular speed $\omega$ and the function f which is independent of the speed $\omega$.

To express the norm Vn1 by the torque T and the angular speed $\omega$, the equation (c11) is rewritten by using the equation (c6). More specifically, because of $R^2+\omega^2 LdLq \approx \omega^2 LdLq$ and $R^2+\omega^2 Ld^2 \approx \omega^2 Ld^2$ in the torque feed-back control, the equation (c6) can be simplified to the equation (c12) by using the relation f($\delta$)=Vn1/$\omega$ obtained from the equation (c11).

$$T = \frac{P}{LdLq} \times \frac{Vn1}{\omega} \times \sin\delta\left\{(Ld-Lq) \times \frac{Vn1}{\omega} \times \cos\delta + Lq\Phi\right\} \quad \text{(c12)}$$

$$= \frac{P}{LdLq} \times f(\delta) \times \sin\delta\{(Ld-Lq) \times f(\delta) \times \cos\delta + Lq\Phi\}$$

$$\equiv g(\delta)$$

In the equation (c12), the function g is defined by the independent variable of the phase $\delta$ and the dependent variable of the torque T. Therefore, the function G can be defined by the independent variable of the torque T and the dependent variable of the phase $\delta$ ($\delta$=G(T)). That is, Vn1$\approx\omega$f(G(T)) is obtained from f($\delta$)=Vn1/$\omega$ and $\delta$=G(T). Therefore, the function H(T) satisfying Vn1$\approx\omega$H(T) is defined from Vn1$\approx\omega$f(G(T)) by the independent variable of the torque T and the dependent variable of the speed normalized norm Vn1/$\omega$. That is, the norm Vn1 is expressed by the required torque Td and the angular speed $\omega$ (Vn1$\approx\omega$H(Td)), so that the unit 36a can calculate the norm Vn1 from the torque Td and the speed $\omega$.

As shown in FIG. 6, the unit 36a has a normalized norm calculating block 50 for calculating the speed normalized norm Vn1/$\omega$ from the target torque Td by using a map (i.e., Vn1=$\omega$H(Td)) indicating the relation of the independent variable of the target torque Td and the dependent variable of the speed normalized norm Vn1/$\omega$, and a multiplier 52 for multiplying the output Vn1/$\omega$ of the block 50 by the angular speed $\omega$ to specify the norm Vn1.

The map is produced by determining the function f indicating the relation between the phase $\delta$ and the speed normalized norm Vn1/$\omega$ and the function G indicating the relation between the phase $\delta$ and the target torque Td by the numerical calculation. Therefore, the relation of the target torque Td and the normalized norm Vn1/$\omega$ can be mapped in advance in the range of the allowable region shown in FIG. 5. This map is obtained by calculating a value of the normalized norm Vn1/$\omega$ for each of a large number of discrete values of the torque T. Accordingly, when the target torque Td and the angular speed $\omega$ are given to the control device 14, the generator 10 can be driven by the minimum current under the torque feed-back control of the control device 14.

Because the generator 10 is driven based on the voltage norm Vn1 determined from the target torque Td and the equation (c10) of the maximum torque control, the current flowing through the generator 10 is controlled to a value, determined from the maximum torque control, under the open-loop control. In other words, because the instructed currents Idc and Iqc are calculated from the target torque Td under the condition ($\partial T/\partial \beta = 0$) of the maximum torque control in the unit 22, the current flowing through the generator 10 is substantially controlled to the currents Idc and Iqc under the open-loop control.

However, characteristics of the generator 10 are determined from parameters such as the number of armature winding linkage magnetic fluxes $\Phi$, the inductances Ld and Lq, the resistance R, the number of pole pairs P and the like used in the unit 36a, and actual values of the parameters in the generator 10 differ from designed values determined for the design of the generator 10 due to the mass production of generators. Further, the actual values of the parameters are changed with the operating temperature or the like or are changed with time due to aging of the generator 10. Therefore, actual characteristics of the generator 10 sometimes differ from designed characteristics. In this case, assuming that the generator 10 is driven by the controlled voltage Vc set at the instructed norm Vn1, the controllability of the instructed currents Idc and Iqc based on the open-loop control, that is, the controllability in the maximum torque control depends on differences between characteristics of the actually-used generator 10 and characteristics of the designed generator. That is, the operating currents Id and Iq actually flowing through the generator 10 in response to the target torque Td sometimes differ from the instructed currents Idc and Iqc calculated from the target torque Td in the unit 22.

To heighten the controllability in the open-loop control and the maximum torque control, the norm Vn1 determined under the open-loop control is corrected by a value Vncor calculated in the norm correcting unit 36b to control the phase β of the actual current (Id, Iq) flowing through the generator 10 to the phase βc of the instructed current (Idc,Iqc) under the feed-back control. When the phase β is controlled to the phase βc, the actual current (Id,Iq) can be controlled to the instructed current (Idc,Iqc). The reason that the actual current is controlled to the instructed current is as follows. When T=Td and β=βc are determined, the amplitude I of the actual current is determined to the value I=Ic according to equation (c2) (Td=P{ΦIc cos βc+1/2×(Ld−Lq)Ic² sin 2βc}). The d-axis current Id is controlled to the value Idc=−Ic sin βc, and the q-axis current Iq is controlled to the value Iqc=Ic cos βc.

Figure 7:
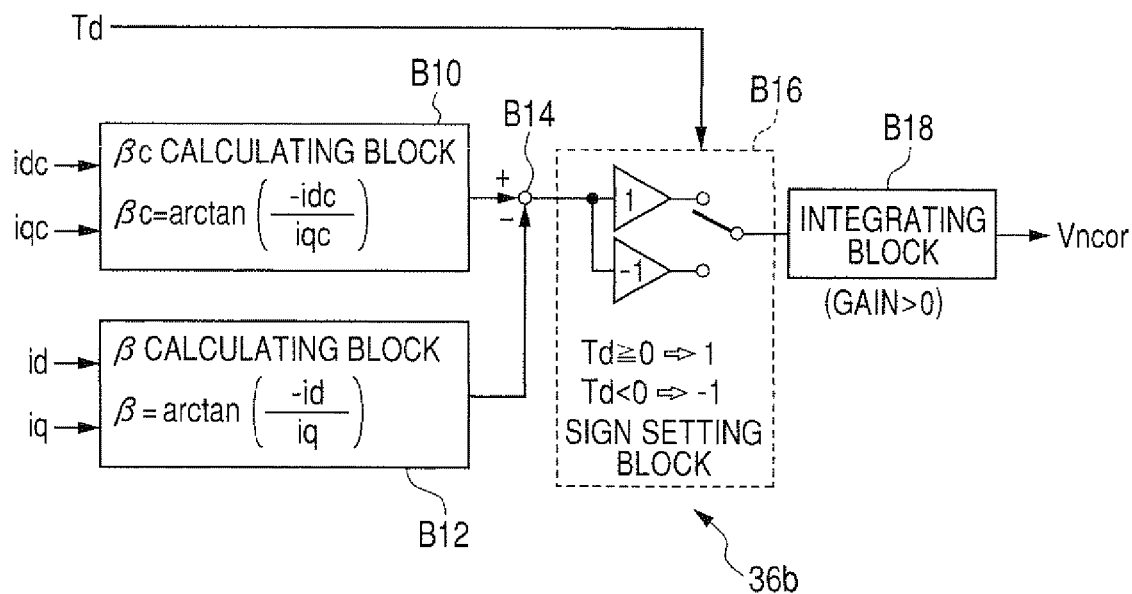
FIG. 7 is a block diagram of a norm correcting unit of the control device shown in FIG. 2.

FIG. 7 is a block diagram of the unit 36b. As shown in FIG. 7, the unit 36b has an instructed current phase (βc) calculating block B10 for calculating the phase βc from the d- and q-axis instructed currents Idc and Iqc, an actual current phase (β) calculating block B12 for calculating the phase β from the d- and q-axis actual currents Id and Iq, and a difference calculating block B14 for calculating the difference βc−β between the phases βc and β.

The phase of the current is defined as an angle from the positive-directional q-axis to the current vector along the counterclockwise direction. Because of the relation Idc=−Ic× sin βc and Iqc=Ic×cons βc, the block B10 calculates the value of arctan(−Idc/Iqc) as the phase βc. Because of the relation Id=−I sin β and Iq=I cons β, the block B12 calculates the value of arctan(−Id/Iq) as the phase β.

The unit 36b further has a correction sign setting block B16 for maintaining the sign of the difference βc−β when the target torque Td is equal to or higher than zero (Td≧0) and inverting the sign of the difference βc−β when the target torque Td is lower than zero (Td<0), and an integrating block B18 for performing an integral calculation for the difference βc−β to calculate a norm correction Vncor. The norm correction Vncor is determined from the integration of the difference multiplied by a positive integrating gain with respect to time.

The reason that the operation of the block B16 is required will be described in detail. Because of the relation R≪ω in the torque feed-back control, the terms of the resistance R are disregarded to simplify the equation (c4), and the relation Id=−I sin β and Iq=I cons β is used in the simplified equation (c4). Then, the partial differential of the controlled voltage Vc(Vd,Vq) with respect to the phase β is performed in the simplified equation (c4) to obtain the equation (c13).

$$\begin{pmatrix} \frac{\partial Vd}{\partial \beta} \\ \frac{\partial Vq}{\partial \beta} \end{pmatrix} = \begin{pmatrix} \omega Lq I \sin\beta \\ -\omega Ld I \cos\beta \end{pmatrix} \qquad (c13)$$

Then, the inner product of the vector (∂Vd/∂β, ∂Vq/∂β) expressed by the equation (c13) and the voltage vector (−V sin δ, V cons δ) is expressed as follows.

$$\begin{pmatrix} \frac{\partial Vd}{\partial \beta} \\ \frac{\partial Vq}{\partial \beta} \end{pmatrix} \cdot (-V\sin\delta \quad V\cos\delta) = -\omega IV(Lq\sin\beta\sin\delta + Ld\cos\beta\cos\delta) \qquad (c14)$$

This inner product expressed by the equation (c14) indicates the changing direction of the voltage vector which is changed in response to the change of the phase β. The inner product having a positive value indicates that the norm of the voltage vector is increased when the phase β is increased or advanced. In contrast, the inner product having a negative value indicates that the norm of the voltage vector is decreased when the phase β is increased or advanced.

When the torque T is positive, the phase δ of the voltage vector is placed in the range of 0≦δ≦π/2, and the phase β of the current vector (Id,Iq) is placed in the range of 0≦β≦π/4. In this case, because all values sin β, sin δ, cos β and cos δ are positive, the inner product is always negative. In contrast, when the torque T is negative, the phase δ is placed in the range of −π/2≦δ<0, and the phase β is placed in the range of −π/4≦β<0. In this case, the inner product is always positive.

Therefore, the block B16 is operated as follows. In response to the target torque Td having a positive value and the phase βc lower than the phase β of the actual current (Td>0, βc<β), the norm correction Vncor is set such that the norm Vn of the voltage vector becomes larger than the norm Vn1, so that the difference βc−β can be decreased. In response to the target torque Td having a positive value and the phase βc higher than the phase β of the actual current (Td>0, βc>β), the norm correction Vncor is set such that the norm Vn becomes smaller than the norm Vn1, so that the difference βc−β can be decreased. In response to the target torque Td having a negative value and the phase βc lower than the phase β of the actual current (Td<0, βc<β), the norm correction Vncor is set such that the norm Vn becomes smaller than the norm Vn1, so that the difference βc−β can be decreased. In response to the target torque Td having a negative value and the phase βc higher than the phase β of the actual current (Td<0, βc>β), the norm correction Vncor is set such that the norm Vn becomes larger than the norm Vn1, so that the difference βc−β can be decreased.

The reason that the block B18 performs the integral calculation will be described. The difference βc−β is caused by differences of actual characteristics of the generator 10 from designed characteristics. These differences are derived from differences of actual values of the parameters specifying characteristics of the generator 10 from designed values of the parameters. In this case, the difference βc−β are steadily generated with respect to time. Therefore, to compensate the norm for the difference βc−β, it is preferred to calculate the correction Vncor from the integral calculation for the difference βc−β, and the parameters can be substantially corrected when the norm Vn1 is corrected by the correction Vncor.

When the target torque Td is changed with time in the transfer state of the generator 10, the difference βc−β is caused by response delay of control or the like, in addition to the differences in the parameters. In this case, it is difficult to correct the norm by the integral calculation. Therefore, the correction Vncor is preferably determined when the generator 10 is set in a steady state so as to maintain the target torque Td.

The operation of the selection control unit 46 will be described.

When the voltage utilization ratio is high, the speed of response to the torque is high in the torque feed-back control section 30, so that the actual torque generated in the generator 10 is quickly changed to the target torque Td in the section 30. In contrast, when the voltage utilization ratio is comparatively low, the speed of response to the torque is high in the current feed-back control section 20. More specifically, when the voltage utilization ratio is higher than 0.71, the controllability in the current feed-back control of the section 20 is sometimes lowered. Therefore, when the ratio indicated by the value Vn/VDC or $(Vdc^2+Vqc^2)^{1/2}$/VDC is lower than 0.71, the unit 46 selects the current feed-back control section 20 such that the control device 14 controls the inverter IV to convert the supply voltage VDC according to the control signals produced in the section 20. In contrast, when the ratio is equal to or higher than 0.71, the unit 46 selects the torque feed-back control section 30 such that the control device 14 controls the inverter IV to convert the supply voltage VDC according to the control signals produced in the section 30.

Figure 8:
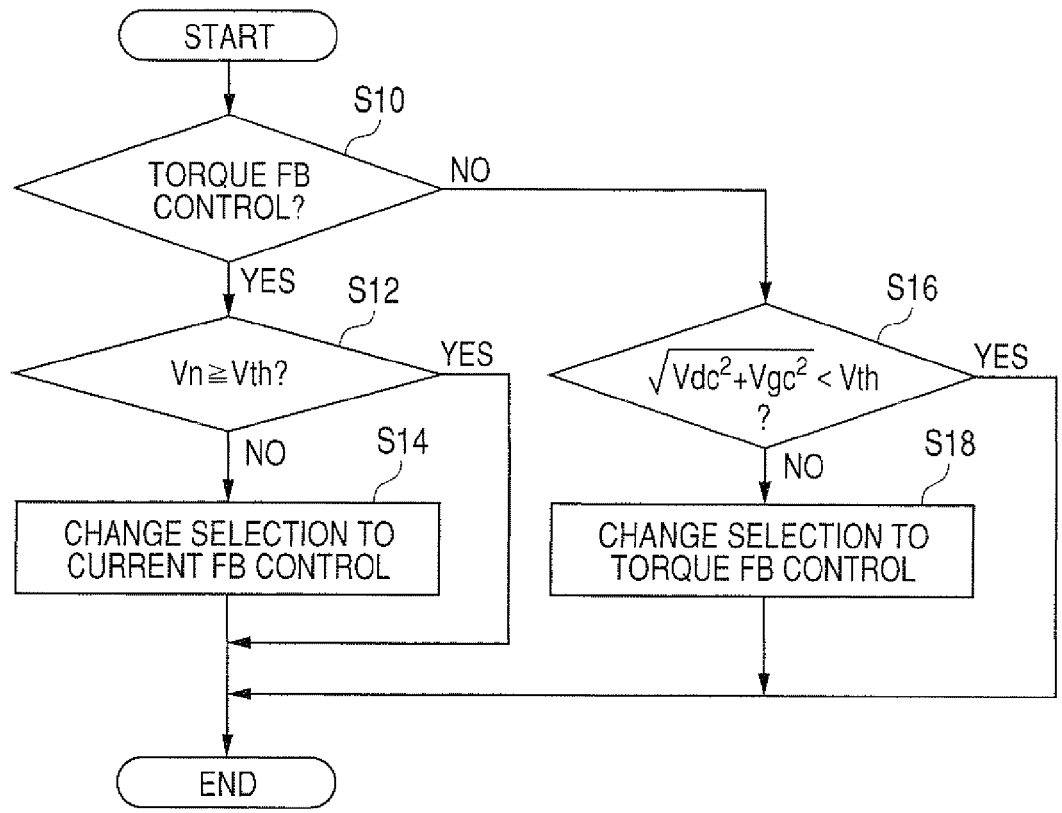
FIG. 8 is a flow chart showing the operation of a selection control unit of the control device shown in FIG. 2.

FIG. 8 is a flow chart showing the operation of the unit 46. As shown in FIG. 8, at step S10, the unit 46 judges whether or not the unit 46 now outputs a signal indicating the selection of the torque feed-back control to the selector 44. In the case of an affirmative judgment at step S10, the unit 46 judges that the control device 14 controls the inverter IV to convert the supply voltage VDC according to the control signals of the unit 38 in the mode of the torque feed-back control. Then, at step S12, the unit 46 judges whether or not the adjusted vector norm Vn of the unit 36 is equal to or larger than a threshold value Vth. This value Vth is set at the upper limit (=0.71) of the voltage utilization ratio at which the inverter IV can convert the supply voltage VDC according to control signals obtained by performing two-phase modulation for the instructed voltage (Vuc, Vvc, Vwc) of the unit 28.

In the case of a negative judgment at step S12, the unit 46 judges that the ratio required of the inverter IV is decreased to be lower than 0.71. Therefore, at step S14, the unit 46 outputs a signal indicating the selection of the current feed-back control to the selector 44 to switch the selection of the selector 44 to the current feed-back control. Therefore, the inverter IV converts the supply voltage VDC according to the control signals of the unit 29 in the mode of the current feed-back control.

In contrast, in the case of a negative judgment at step S10, the unit 46 judges that the inverter IV is now operated in the current feed-back control. Then, at step S16, the unit 46 judges whether or not the norm $(Vdc^2+Vqc^2)^{1/2}$ of the voltage vector (Vdc,Vqc) calculated in the units 25 and 26 is smaller than the threshold Vth. In the case of a negative judgment at step S16, the unit 46 judges that the ratio required of the inverter IV is increased to be equal to or higher than 0.71. Therefore, at step S18, the unit 46 outputs a signal indicating the selection of the torque feed-back control to the selector 44 to switch the selection of the selector 44 to the torque feed-back control. Therefore, the inverter TV converts the supply voltage VDC according to the control signals of the unit 38 in the mode of the torque feed-back control.

When the process at step S14 or S18 is completed or in the case of an affirmative judgment at step S12 or step S16, this processing is finished. The processing shown in FIG. 8 is repeatedly performed.

Further, when the unit 46 switches the selection from the current feed-back control to the torque feed-back control, the unit 46 initializes the controlled phase δc set in the unit 34 at δ0, and initializes the gain in the block B18 of the unit 36b to zero. The value δ0 is set at arctan(−Vdc/Vqc) by using the values Vdc and Vqc calculated in the units 25 and 26 just before the switching to the torque feed-back control. Therefore, when the unit 46 switches the selection from the current feed-back control the torque feed-back control, the controlled phase δc of the controlled voltage Vc can be continuously and smoothly changed.

When the unit 46 switches the selection from the torque feed-back control to the current feed-back control, the unit 46 initializes the d- and q-axis instructed voltages Vdc and Vqc of the units 25 and 26 at values Vd0 and Vq0. More specifically, the unit 46 initializes the integration terms in the units 25 and 26 at values Vd0 and Vq0. These initial values Vd0 and Vq0 are, respectively, set at −Vn sin δc and Vn cos δc. The controlled phase δc and the voltage norm Vn used for the initial values Vd0 and Vq0 are, respectively, determined in the units 34 and 36 just before the switching to the current feed-back control. Therefore, when the unit 46 switches the selection from the torque feed-back control to the current feed-back control, the phase and amplitude of the output voltage instructed to the inverter IV can be continuously and smoothly changed, and the inverter IV can stably convert the supply voltage VDC to the controlled voltage Vc.

Figure 9:
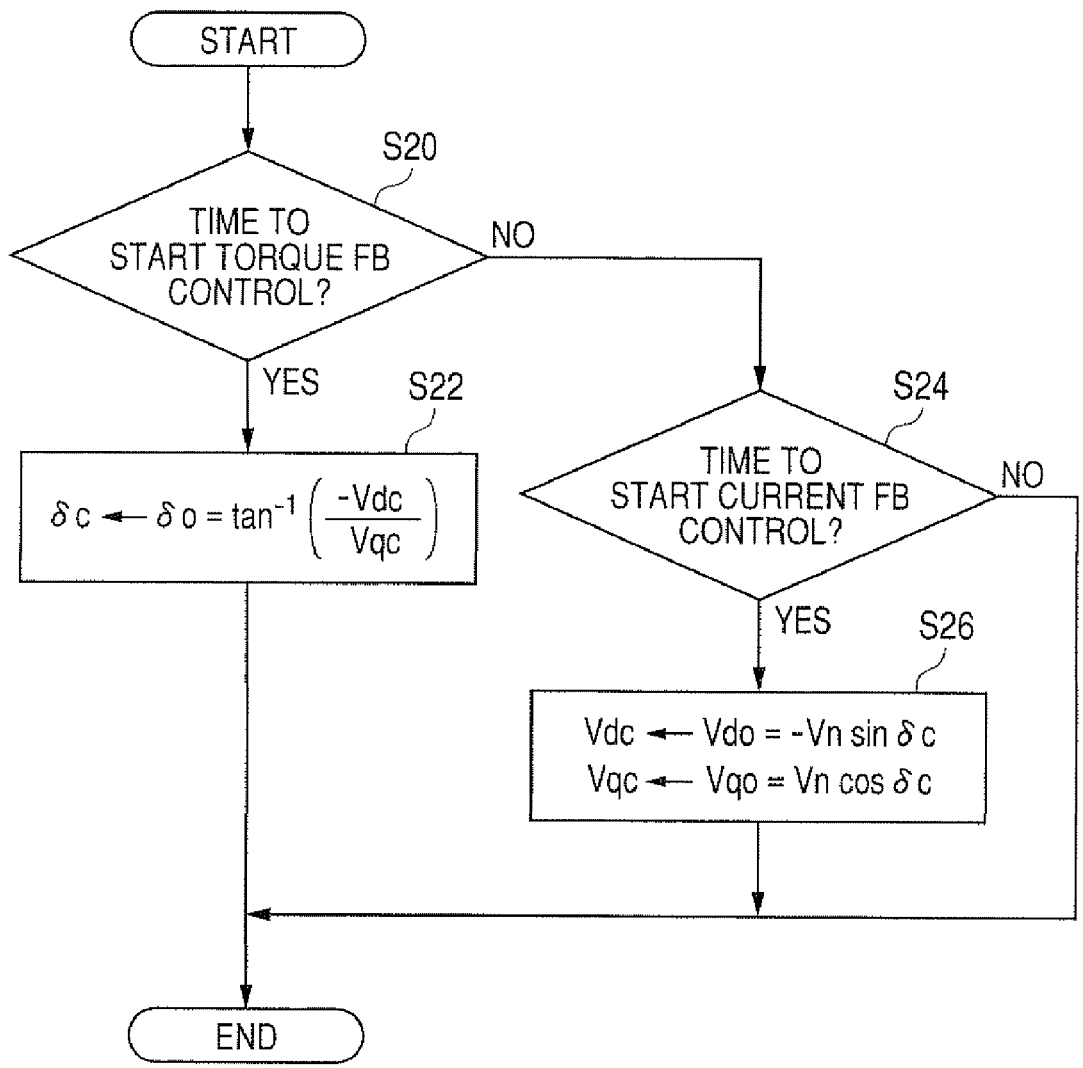
FIG. 9 is a flow chart showing the initialization process of the selection control unit.

FIG. 9 is a flow chart showing the initialization process of the unit 46 performed just after the selection switching.

As shown in FIG. 9, at step S20, the unit 46 judges whether or not it is now a selection changing time to start the torque feed-back control. In the case of an affirmative judgment at step S20, the unit 46 judges that the torque feed-back control for the generator 10 is started. Then, at step S22, the unit 46 outputs the initial value δ0 to the unit 34 to initialize the controlled phase δc at the value δ0. Further, the unit 46 initializes the gain in the block B18 of the unit 36b to zero.

In contrast, in the case of a negative judgment at step S20, at step S24, the unit 46 judges whether or not it is now a selection changing time to start the current feed-back control. In the case of an affirmative judgment at step S24, the unit 46 judges that the current feed-back control for the generator 10 is started. Then, at step S26, the unit 46 gives the initial values Vd0 and Vq0 to the units 25 and 26 as instructed voltages Vdc and Vqc.

When the process at step S22 or S26 is completed or in the case of a negative judgment at step S24, this processing is finished. This initialization process is repeatedly performed in a predetermined cycle.

Accordingly, when the unit 46 switches the selection from the torque feed-back control to the current feed-back control, fluctuations of the controlled voltage Vc of the inverter IV can be appropriately reduced or suppressed. That is, as described above, during the torque feed-back control of the section 30, the phase β of the actual current is controlled to the phase βc in the unit 36b under the feed-back control, and the amplitude Ic of the instructed current is determined from the target torque Td and the controlled phase βc according to equation (c2). From the phase βc and the amplitude Ic, the phase and amplitude of the control voltage Vc are determined according to equation (c4). Therefore, because the unit 36b controls the phase β of the actual current to the phase βc under the feed-back control, the d- and q-axis actual currents Id and Iq flowing through the generator 10 can be controlled to the d- and q-axis instructed currents Idc and Iqc. Therefore, when the unit 46 switches the selection from the torque feed-back control to the current feed-back control, the current can stably flow through the generator 10. Further, the controlled voltage Vc set in the torque feed-back control can become the same as that in the current feed-back control. Therefore, fluctuations of the controlled voltage Vc of the inverter IV can be appropriately reduced or suppressed. Because fluctuations of the controlled voltage Vc of the inverter IV are suppressed, a transient current flowing through the capacitor C1 in response to the switching of the feed-back control can be reduced.

Therefore, the capacitance of the capacitor C1, required to absorb the transient current, can be reduced.

Effects in this embodiment are described as follows.

The vector norm Vn1 of the controlled voltage Vc calculated in the unit 36a is corrected to the adjusted vector norm Vn according to the difference of the phase β of the actual current components Id and Iq and the phase βc of the instructed current components Idc and Iqc to control the phase β to the phase βc under the feed-back control. Accordingly, even when actual values of the parameters of the generator 10 differ from designed values of the parameters so as to differentiate the vector norm Vn1 from the adjusted vector norm Vn required to control the phase β to the phase βc, the control device 14 can reliably set the vector norm of the controlled voltage Vc so as to control the phase β to the phase βc.

When the target torque Td is positive, the unit 36 determines the adjusted vector norm Vn larger than the vector norm Vn1 in case of the phase β of the actual current advanced as compared with the phase βc of the instructed current. When the target torque Td is negative, the unit 36 determines the adjusted vector norm Vn larger than the vector norm Vn1 in case of the phase β retarded as compared with the phase βc. Accordingly, the control device 14 can appropriately control the phase β to the phase βc under the feed-back control.

The unit 36b performs an integral calculation for the difference between the phase of the actual current and the phase of the instructed current to calculate the norm correction Vncor. Because this difference is caused due to differences between actual values and designed values of the parameters, the difference is steady with respect to time. Accordingly, the integral calculation is preferred to calculate the norm correction Vncor.

The control device 14 has the current feed-back control section 20, the torque feed-back control section 30, and the selection control unit 46 for selecting either the current feed-back control or the torque feed-back control of the section 20 or 30. Because the norm correcting unit 36b of the section 30 performs the current feed-back control to control the phase β of the actual current to the phase βc of the instructed current, when the unit 46 switches the selection from the torque feed-back control of the section 30 to the current feed-back control of the section 20, fluctuations of the controlled voltage Vc of the inverter IV can be appropriately reduced or suppressed.

The norm determining unit 36 determines the vector norm Vn1 of the controlled voltage Vc from the target torque Td and the electrical angular speed ω. Accordingly, the vector norm Vn1 can be freely designed in an allowable region. For example, as compared with the current feed-back control of the section 20, the degree of freedom in the production of the control signals performed in the unit 38 can be improved, and the controllability of the generator 10 can be maintained at high level.

Second Embodiment

In the first embodiment, even when the unit 46 switches the select ion from the torque feed-back control of the section 30 to the current feed-back control of the section 20, fluctuations of the controlled voltage Vc can be reduced. However, when the unit 46 switches the selection from the current feed-back control of the section 30 to the torque feed-back control, the norm correction Vncor becomes zero due to the gain of the block B18 initialized to zero. Therefore, fluctuations of the controlled voltage Vc are sometimes caused.

In the second embodiment, the unit 36b is configured such that the norm correction Vncor is appropriately set, just after the switching to the torque feed-back control, to correct the instructed vector norm Vn1 of the unit 36a by the correction Vncor.

Figure 10:
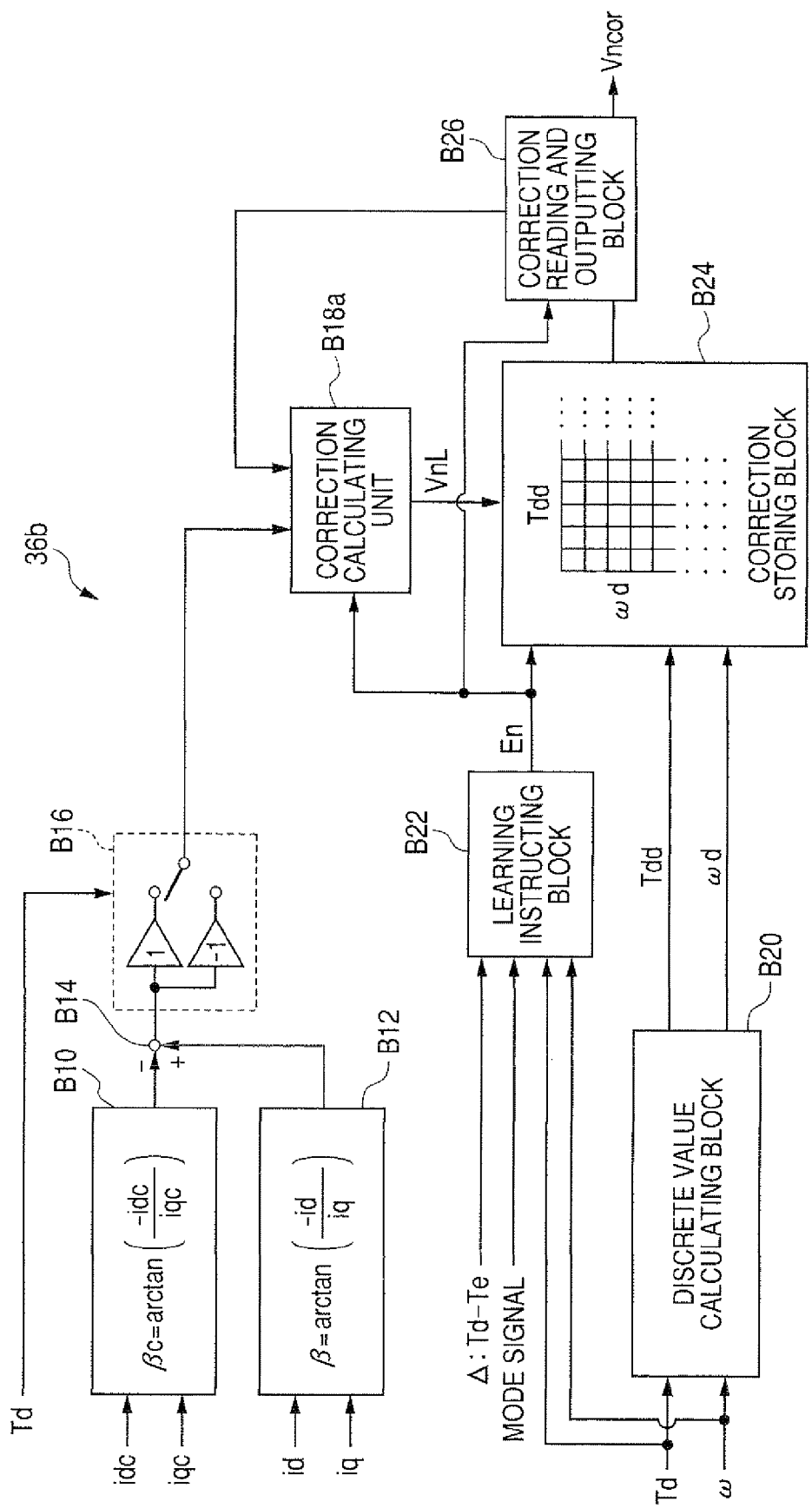
FIG. 10 is a block diagram of a norm correcting unit of the control device according to the second embodiment of the present invention.

FIG. 10 is a block diagram of the unit 36b according to the second embodiment. All blocks of the unit 36b are operated every unit time in response to a timing signal (not shown).

As shown in FIG. 10, in addition to the blocks B10, B12 and B16, the unit 36b has a discrete value calculating block B20 for calculating a value of a discrete torque Tdd and a value of a discrete angular speed ωd from the target torque (i.e., control variable of the generator 10) Td and the angular speed (i.e., controlled variable of the generator 10) ω, and a learning instructing block B22 for judging whether or not the section 30 steadily controls the generator 10 to generate the target torque Td stably set at a constant value, outputting a learning instructing signal E indicating the permission of a learning operation when the section 30 steadily controls the generator 10 to set the generator 10 in the steady state, and outputting another learning instructing signal E indicating the prohibition of the learning operation when the section 30 steadily controls the generator 10 to set the generator 10 in the transitional state.

The target torque Td and the angular speed ω are control and controlled variables indicating the operating state of the generator 10. The block B20 stores a unit torque Tunit and a unit angular speed ωunit, calculates an integral part of a dividend, obtained by dividing the target torque Td by the unit torque Tunit, as the discrete torque Tdd, and calculates an integral part of a dividend, obtained by dividing the electrical angular speed ω by the unit angular speed ωunit, as the discrete angular speed ωd.

To judge whether or not the torque of the generator 10 is steadily controlled by the section 30, the block B22 performs the judgment about three learning conditions every unit time according to the torque difference Δ(=Td−Te), the target torque Td and the angular speed ω during the period of the torque feed-back control of the section 30. When a mode signal received from the unit 46 indicates the mode of the torque feed-back control selected in the unit 46, the block B22 judges to be in the period of the torque feed-back control. When all the learning conditions are satisfied, the block B22 judges that the torque feed-back control in the section 30 is steadily performed, permits the learning operation, and outputs the signal E set at "1" to the blocks B18a, B24 and B26. In contrast, when at least one of the learning conditions is not satisfied, the block B22 judges that the torque feed-back control in the section 30 is not steadily performed, prohibits the learning operation, and outputs the signal E set at "0" to the blocks B18a, B24 and B26.

The first learning condition is that the torque difference Δ(=Td−Te) is substantially small. In this embodiment, when the absolute value of the torque difference Δ is smaller than the unit torque Tunit, the block B22 judges that the torque difference Δ is substantially small, and the phase β is reliably controlled to the phase βc under the maximum torque control. In contrast, when the absolute difference Δ is equal to or larger than the unit torque Tunit, the block B22 judges that the torque difference Δ is too large to steadily perform the torque feed-back control. That is, the generator 10 is set in the transitional state. In this case, even when the phase β is controlled to the phase βc, the current of the generator 10 is not adjusted under the maximum torque control.

The unit torque Tunit is preset such that the torque difference Δ is substantially stable when the absolute difference Δ is smaller than the unit torque Tunit.

The second learning condition is that the angular speed ω is substantially stable with respect to time. In this embodiment, when a change of the angular speed ω in one time unit is smaller than the unit angular speed ωunit, the block B22 judges that the angular speed ω is substantially stable. In contrast, when a change of the angular speed ω in one time unit is equal to or larger than the unit angular speed ωunit, the block B22 judges that the angular speed ω is unstable so as to set the generator 10 in the transitional state. In this case, because the norm Vn1 of the unit 36a is changed with the angular speed ω, it is difficult to appropriately determine the norm correction Vncor.

The unit angular speed ωunit is preset such that the angular speed ω is substantially stable when a change of the angular speed ω in one unit time is smaller than the unit angular speed ωunit.

The third learning condition is that the target torque Td is substantially stable with respect to time. In this embodiment, when a change of the target torque Td in one time unit is smaller than the unit torque Tunit, the block B22 judges that the target torque Td is substantially stable. In contrast, when a change of the target torque Td in one time unit is equal to or larger than the unit torque Tunit, the block B22 judges that the target torque Td is unstable so as to set the generator 10 in the transitional state. In this case, because the norm Vn1 of the unit 36a is changed with the target torque Td, it is difficult to appropriately determine the norm correction Vncor.

The unit time is preset such that the target torque Td is substantially stable when a change of the target torque Td in one unit time is smaller than the unit torque Tunit.

Figure 11:
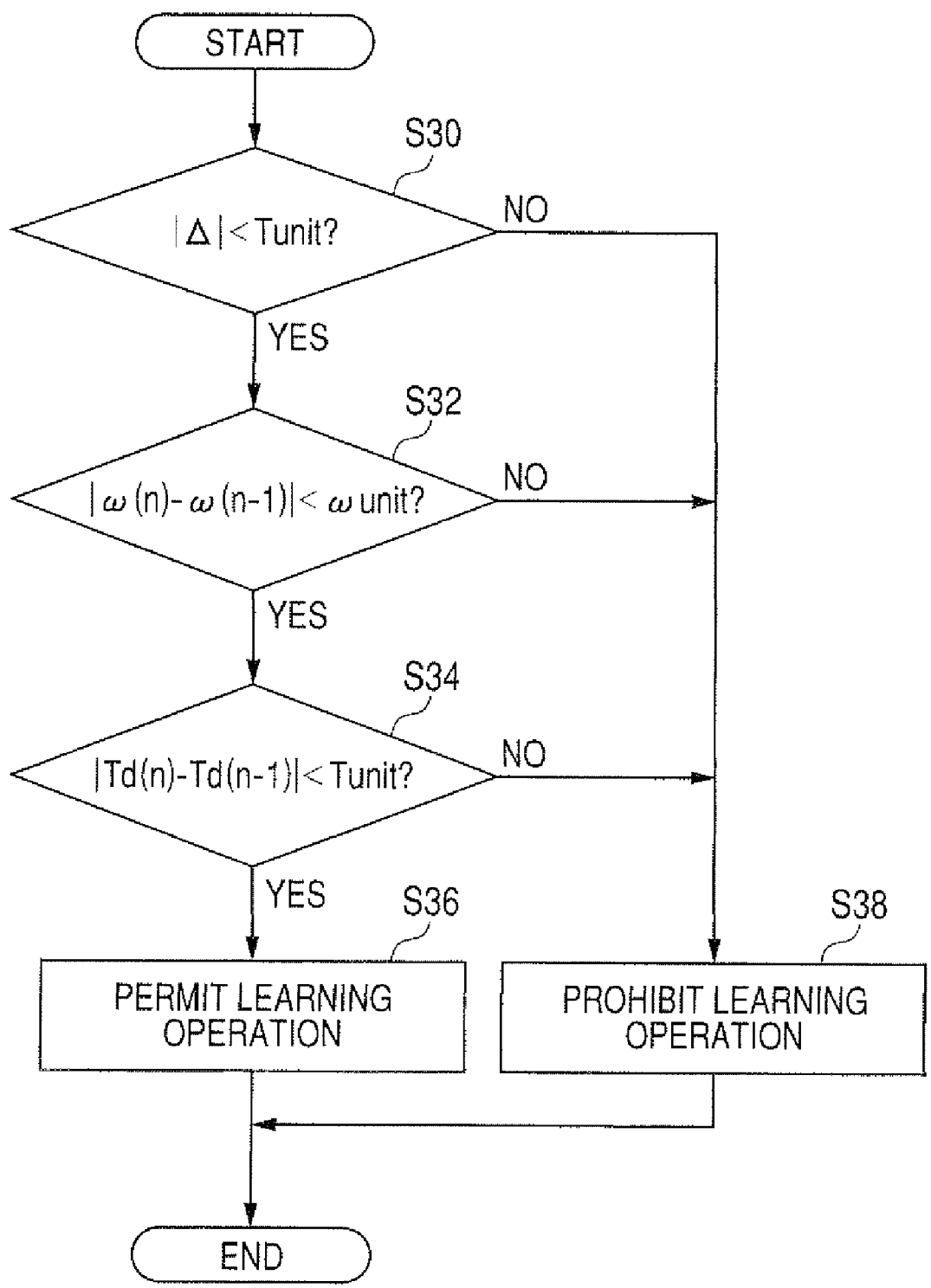
FIG. 11 is a flow chart showing the procedure in a learning instructing block of the unit shown in FIG. 10.

FIG. 11 is a flow chart showing the procedure in the block B22. As shown in FIG. 11, at step S30, the block B22 judges whether or not the absolute value of the torque difference Δ is smaller than the unit torque Tunit. In the case of an affirmative judgment, at step S32, the block B22 judges whether or not a change of the angular speed ω in one time unit is smaller than the unit angular speed ωunit. This change is indicated by the absolute value of the difference between the angular speed ω(n) at this time and the angular speed ω(n−1) at a time earlier by one unit time. In the case of an affirmative judgment at step S32, at step S34, the block B22 judges whether or not a change of the target torque Td in one time unit is smaller than the unit torque Tunit. This change is indicated by the absolute value of the difference between the target torque Td(n) at this time and the target torque Td (n−1) a time earlier by one unit time.

In the case of an affirmative judgment at step S34, at step S36, the block B22 outputs the signal E set at 1 to notify the permission of the learning operation. In contrast, in the case of a negative judgment at step S30, step S32 or step S34, at step S38, the block B22 outputs the signal E set at 0 to notify the prohibition of the learning operation.

The unit 36b further has a correction calculating block B18a for performing an integral calculation for the difference βc−β, in response to the permission of the learning operation, to calculate a learned norm correction VnL, a correction storing block B24 for preparing in advance a storing area partitioned into regions, corresponding to values of the discrete torque Tdd and values of the discrete angular speed ωd, in two-dimensions, writing the correction VnL currently calculated in the block B18a into the region, corresponding to the value of the discrete torque Tdd and the value of the discrete angular speed ωd currently calculated in the block B20, in response to the permission of the learning operation, and a correction reading and outputting block B26 for reading out the correction VnL, stored in the region corresponding to the discrete torque Tdd and the discrete angular speed ωd currently calculated in the block B20, from the block B24, outputting the read-out correction VnL to the unit 36c as a norm correction Vncor during the torque feed-back control and outputting the read-out correction VnL to the block B18a in response to the prohibition of the learning operation.

The block B18a performs the integral calculation in the same manner as in the block 18. That is, when the block B22 permits the learning operation, the integral calculation: $A1 \times \int (\beta c-\beta)dt$ (if $Td \geq 0$) or $A1 \times \int (\beta-\beta c)dt$ (if $Td<0$) is performed in a predetermined period of time to calculate the learned norm correction VnL. When the block B22 prohibits the learning operation, the block B18a performs no integral calculation. To compensate the loss of the part of the correction VnL in the prohibition period of the learning operation, the correction VnL already stored in the block B24 is sent back to the block B18a in the prohibition period. For example, the block B18a calculates a correction VnL when the discrete torque Tdd and the discrete angular speed ωd have particular values in the steady state of the control, and the block B24 writes this correction VnL in a particular region. Thereafter, when the discrete torque Tdd and the discrete angular speed ωd have the same particular values in the transitional state of the control, the block B18a calculates no correction VnL. In contrast, the block B26 sends back the correction VnL stored in the particular region to the block B18a. Therefore, the block 18a can perform the integral calculation in the predetermined period including the prohibition period, and the correction VnL can be quickly calculated to be appropriately set.

Figure 12:
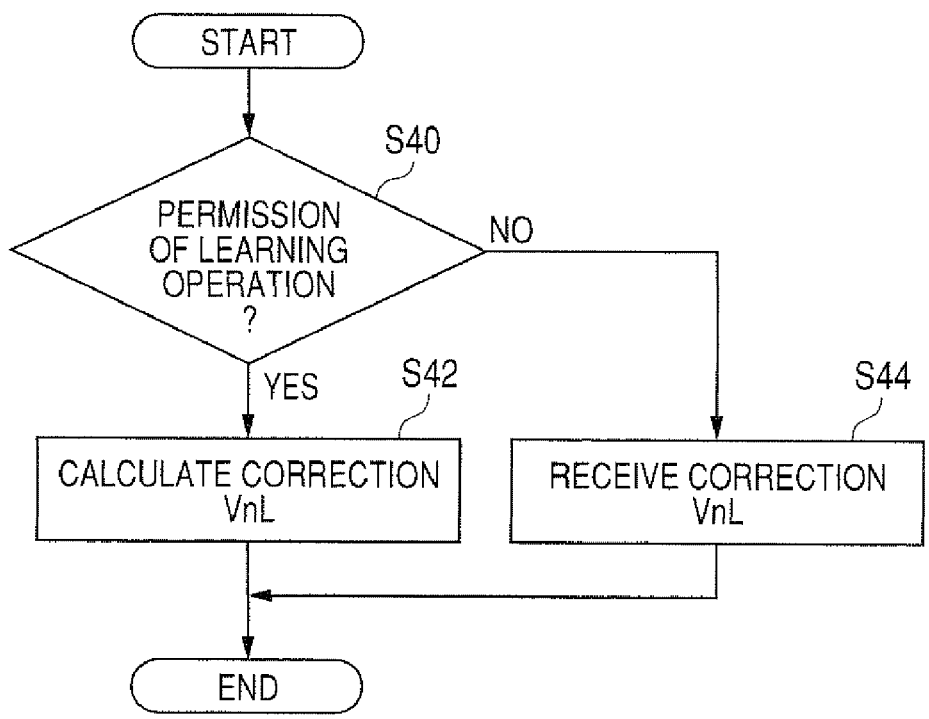
FIG. 12 is a flow chart showing the procedure in a correction calculating block of the unit shown in FIG. 10.

FIG. 12 is a flow chart showing the procedure in the block B18a. As shown in FIG. 12, at step S40, the block B18a judges whether or not the block B22 permits the learning operation. When the signal E is set at "1" (YES at step S40), at step S42, the block B22 performs the integral calculation to calculate the correction VnL and to output the correction VnL. In contrast, when the signal E is set at "0" (NO at step S40), at step S44, the block B22 performs no integral calculation and receives the correction VnL, corresponding to the target torque Td and the angular speed ω at the present time, from the block B24.

Figure 13:
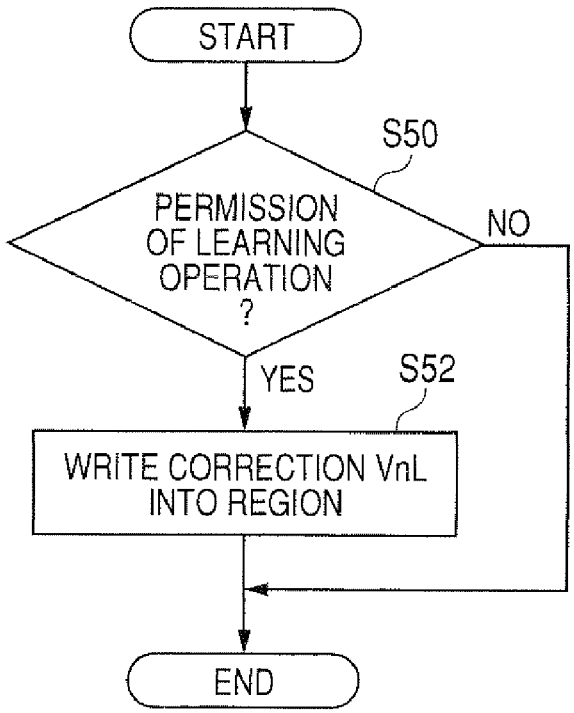
FIG. 13 is a flow chart showing the procedure in a correction storing block of the unit shown in FIG. 10.

FIG. 13 is a flow chart showing the procedure in the block B24. As shown in FIG. 13, at step S50, the block B24 judges whether or not the block B22 permits the learning operation. When the signal E is set at "1" (YES at step S50), at step S52, the block B24 writes the correction VnL, currently calculated in the block B18a, into the region corresponding to the discrete torque Tdd and the discrete angular speed ωd currently calculated in the block B20. In contrast, when the signal E is set at "0" (NO at step S50), this procedure is ended without writing the correction VnL into the block B24.

Figure 14:
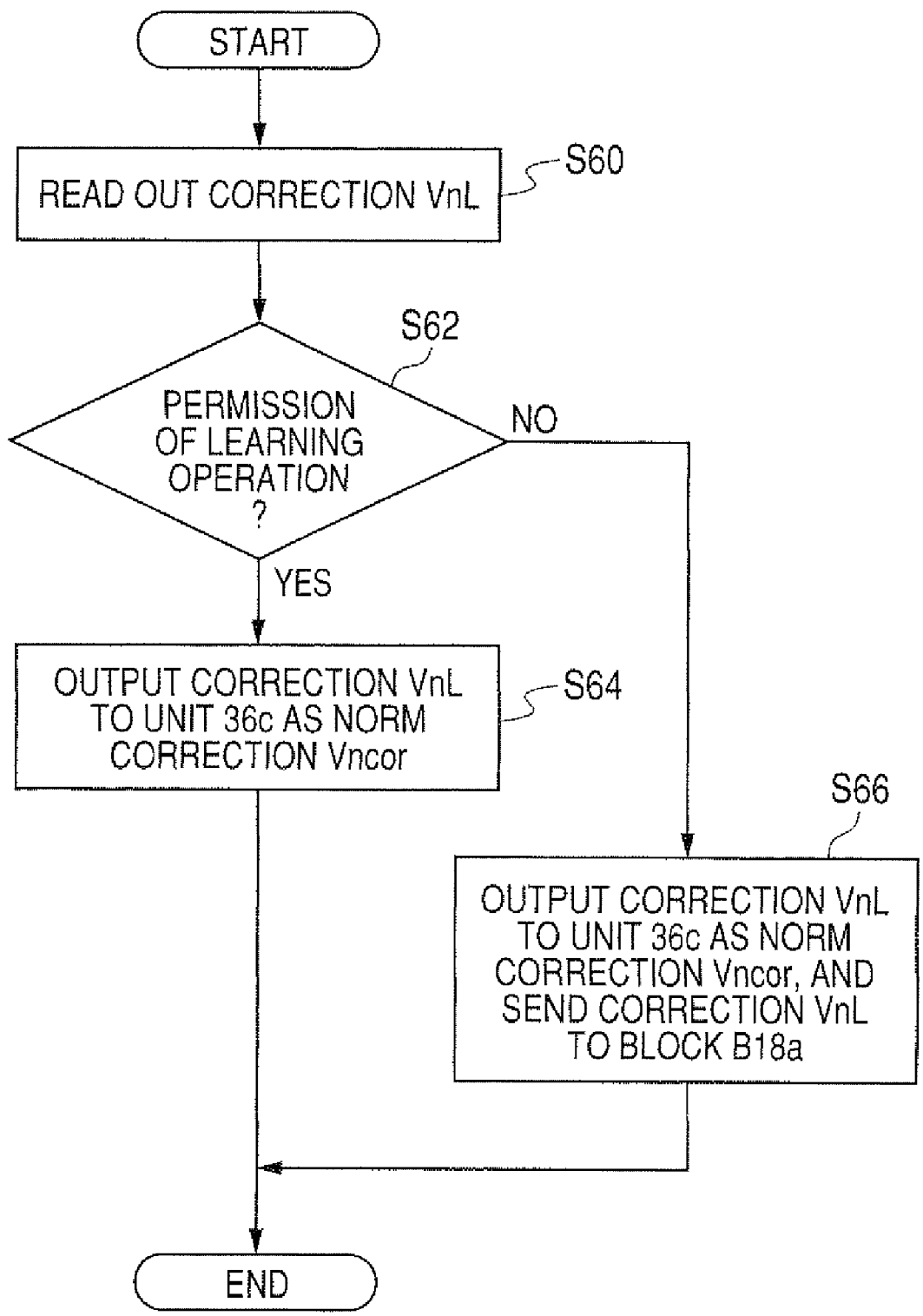
FIG. 14 is a flow chart showing the procedure in a correction reading and outputting block of the unit shown in FIG. 10.

FIG. 14 is a flow chart showing the procedure in the block B26. As shown in FIG. 14, at step S60, the block B26 reads out the correction VnL of the region, specified by the discrete torque Tdd and the discrete angular speed ωd currently calculated in the block B20, from the block B24 every unit time. At step S62, the block B26 judges whether or not the block B22 permits the learning operation. When the signal E is set at "1" (YES at step S62), at step S64, the block B26 outputs the read-out correction VnL to the unit 36c as a norm correction Vncor. In contrast, when the signal E is set at "0" (NO at step S62), at step S66, the block B26 outputs the read-out correction VnL to the unit 36c as a norm correction Vncor and sends this correction VnL to the block B18a.

Effects obtained in the unit 36h according to this embodiment will be described.

The unit 36b writes the correction VnL, calculated in each level of the operating state of the generator 10, into the region corresponding to this level of the operating state. The level of the operating state of the generator 10 is substantially specified by the value of the target torque Td and the value of the angular speed ω. Accordingly, the unit 36b can quickly output the correction VnL, corresponding to the present level of the operating state, as the norm correction Vncor. For example, even when the unit 46 switches the selection from the current feed-back control of the section 20 to the torque feed-back control of the section 30, the unit 36b can quickly obtain the norm correction Vncor corresponding to the target torque Td and the angular speed ω set just after the selection switching.

The unit 36b calculates the correction VnL on condition that the torque feed-back control of the section 30 is steadily performed. Accordingly, the response delay caused in the transitional state of the control can be preferably prevented, so that errors caused by the response delay can be removed from the norm correction Vncor. Further, the unit 36b can learn the differences between the actual values of the parameters and the designed values with high precision.

The unit 36b calculates the correction VnL when three learning conditions are satisfied. The first learning condition is that the difference between the torque actually generated and estimated in the generator 10 and the target torque Td is substantially stable. The second learning condition is that the angular speed ω is substantially stable. The third learning condition is that the target torque Td is substantially stable. Accordingly, the unit 36b can learn the correction VnL when the torque feed-back control is reliably set in the steady state.

When the torque feed-back control is not set in the steady state, the unit 36b prohibits the learning operation and stops the integral calculation of the block B18a. To smoothly perform the integral calculation in the period including the period of the prohibition, the correction VnL already stored in the block B24 is sent back to the block b18a. Accordingly, the amount of the calculation can be reduced, and the calculation result can be quickly converged to a proper value.

Other Embodiments

In the first embodiment, the norm correcting unit 36b always corrects the norm Vn1 of the unit 36a. However, the unit 36b may correct the norm Vn1 only when the control of the section 30 is steady so as to set the generator 10 in the steady state.

Further, when the unit 46 switches the selection from the control of the section 20 to the control of the section 30, although the controlled phase δc is set at the initial value δ0 determined from the phase of the d- and q-axis instructed voltages Vdc and Vqc, the initialization of the norm. Vn is not performed based on any record of the current feed-back control of the section 20. However, the norm Vn may be set at the initial value determined based on the record of the current feed-back control performed in the section 20. For example, the control device 14 may have a changing unit that gradually changes the adjusted vector norm Vn from the vector norm of the instructed voltages Vdc and Vdq to the vector norm Vn1 of the unit 36a when the unit 46 switches the selection to the control of the section 30.

In the second embodiment, when a learned norm correction VnL newly calculated in the block B18a is written into a region of the unit B24 in response to the permission of the learning operation, another correction VnL already stored in the region of the unit B24 is deleted. However, the mean value of the newly-calculated correction VnL and the already-stored correction VnL may be written into the region. Further, each of the newly-calculated correction VnL and the already-stored correction VnL may be weighted by a weighting factor. In this case, the weighted mean value of the weighted corrections VnL is rewritten into the region.

Further, in the second embodiment, the correction VnL calculated in the block B18a is finally set as a norm correction Vncor of the unit 36b. However, the unit 36b may have the integrating block B18 according to the first embodiment in place of the block B18a. More specifically, the norm correction VnL calculated in the block B18 in the same manner as the calculation of the correction Vncor in the first embodiment is written into the block B24 in response to the permission of the learning operation, and the mean value of the correction VnL newly calculated in the block B18 and the correction VnL already stored in the block B24 is outputted as a norm correction Vncor. Further, the norm correction VnL may be always calculated in the block B18 during the control of the section 30 to write the correction VnL in the block B24. In this case, to appropriately set the norm correction Vncor, each of the correction VnL newly calculated in the block B18 and the already-stored correction VnL may be weighted by a weighting factor to output the weighted mean value of the weighted corrections VnL as the norm correction Vncor. Moreover, the unit 36b may have a proportional and integral calculator or a proportional, integral and differential calculator in place of the integrating block B18.

In the second embodiment, the target torque Td and the electrical angular speed ω indicating the operating state of the generator 10 are used in the block B24 as control and controlled variables to specify each of the regions of the storing area. However, the combination of the estimated torque Te and the speed ω or the combination of the d- and q-axis instructed voltages Idc and Iqc and the rotational speed of the rotor may be used as controlled variables or controlled variables. Further, the operating temperature of the generator 10 or the ambient temperature influencing on the operating state of the generator 10 may be added. Moreover, only the target torque Td or only the electrical angular speed ω may be used as a control variable or a controlled variable. Furthermore, the regions of the block B24 may be partitioned by the temperature. Still further, the correction VnL may be stored in a single region of the block B24 while repeatedly replacing the stored correction VnL with the weighted mean value of the already-stored correct ion VnL and the newly-calculated correction VnL. In this case, the time required to convert the correction VnL at a proper value can be sometimes shortened.

In the second embodiment, when the three learning conditions (i.e., the condition that the torque difference $\Delta(=Td-Te)$ is substantially stable, the condition that the angular speed ω is substantially stable, and the condition that the target torque Td is substantially stable) are satisfied together, the control device 14 judges that the control of the section 30 is stable so as to set the generator 10 in the steady state. However, when the generator 10 is operated under one of the three learning conditions or two of the three learning conditions, the control device 14 may judge that the control of the section 30 is stable. Further, when a change in the controlled phase δc determined in the unit 34 is smaller than a predetermined value or when a change in the integral component of the controlled phase δc is smaller than a predetermined value, the control device 14 may judge that the control of the section 30 is stable.

In the first and second embodiments, the sign of the difference between the phases βc and β calculated in the block B14 of the unit 36b is maintained or inverted according to the sign of the required torque Td. However, the sign of the difference may be maintained or inverted according to the sign of the estimated torque Te. Further, in place of the sign of the difference, the sign of the gain for the integral calculation in the block B18 or B18a may be maintained or inverted according to the sign of the required torque Td.

In the embodiments, the torque feed-back control of the section 30 is designed such that the maximum torque control is performed for the generator 10. However, the torque feed-back control of the section 30 may be designed such that the maximum efficiency control or the Id=0 control for controlling the d-axis current Id to zero may be performed for the generator 10. When the section 20 performs the same maximum efficiency control or the same Id=0 control as that of the section 30 for the generator 10, fluctuations of the controlled voltage Vc outputted from the inverter IV can be reduced or suppressed when the unit 46 switches the selection between the controls of the sections 20 and 30. Further, even when the section 20 does not perform the maximum efficiency control or the control for the generator 10, the correction of the vector norm Vn1 by the norm correction Vncor is effective to control the generator 10 under the torque feed-back control as designed.

In the embodiments, the unit 36b calculates the norm correction Vncor required to control the phase β of the actual currents Id and Iq to the phase βc of the instructed currents Idc and Iqc. However, the unit 36b may calculate a norm correction required to control the amplitude of the actual currents Id and Iq to the amplitude of the instructed currents Idc and Iqc. Because the phase of current can be determined from the amplitude of the current and the torque according to the equation (c2), the control voltage Vc of the inverter IV under the torque feed-back control of the section 30 can be controlled to the same one as the instructed voltages Vdc and Vqc of the section 20.

In the embodiments, the units 25 and 26 of the section 20 directly calculate the instructed voltages Vdc and Vqc. However, a component of a non-interference term acting as a feed-forward term may be added to each of the d- and q-axis outputs of the units 25 and 26 to calculate the instructed voltages Vdc and Vqc. In this case, it is preferred that each of the initial values Vd0 and Vq0 of the integral terms outputted from the unit 46 to the units 25 and 26 be decreased by the component value of the non-interference term.

The generator 10 having the feature of the magnetic saliency is a three-phase interior permanent magnet synchronous motor (IPMSM). However, the generator 10 may be a synchronous reluctance motor (SynRM).

The electric rotating machine represented by the generator 10 has the feature of the magnetic saliency. However, the machine may have no magnetic saliency. In this case, in the model expressing the torque by using the phase δ and the norm Vn1 of the voltage, if the one-to-one correspondence between the phase δ and the norm Vn1 is obtained under the condition that the partial differential of the torque T with respect to the norm Vn1 is zero ($\partial T/\partial Vn1=0$), the control signals may be produced in the unit 38.

The electric rotating machine is mounted on a hybrid vehicle. However, the machine may be mounted on an electric vehicle. Further, the machine is not limited to a member of a driving system of a vehicle.

These embodiments should not be construed as limiting the present invention to structures of those embodiments, and the structure of this invention may be combined with that based on the prior art.

What is claimed is:

1. A control device for controlling a multi-phase electric rotating machine by controlling a power inverter circuit to output a controlled voltage of a multi-phase current to the machine, comprising:

a phase determining unit that determines a phase of the controlled voltage at a controlled phase to control an operating torque, generated in the machine from the controlled voltage set at the controlled phase, to a target torque under a torque feed-back control;

a norm calculating unit that calculates an instructed vector norm of the controlled voltage while using a parameter indicating a characteristic of the machine to control a current, flowing through the machine in response to the controlled voltage set at the instructed vector norm and the controlled phase, to an instructed current corresponding to the target torque under an open-loop control;

a norm correcting unit that corrects the instructed vector norm of the norm calculating unit to an adjusted vector norm to control an operating current, flowing through the machine in response to the controlled voltage set at the adjusted vector norm and the controlled phase, to the instructed current under a feed-back control; and a torque feed-back control unit that controls the machine to generate the target torque in response to the controlled voltage, set at the controlled phase of the phase determining unit and the adjusted vector norm of the norm correcting unit, under the torque feed-back control.

2. The control device according to claim 1, wherein, when the target torque is positive, the correcting unit determines the adjusted vector norm larger than the instructed vector norm in case of a phase of the operating current advanced as compared with a phase of the instructed current, and determines the adjusted vector norm smaller than the instructed vector norm in case of the phase of the operating current retarded as compared with the phase of the instructed current.

3. The control device according to claim 1, wherein, when the target torque is negative, the correcting unit determines the adjusted vector norm larger than the instructed vector norm in case of a phase of the operating current retarded as compared with a phase of the instructed current, and determines the adjusted vector norm smaller than the instructed vector norm in case of the phase of the operating current advanced as compared with the phase of the instructed current.

4. The control device according to claim 1, wherein the correcting unit performs an integral calculation for a difference between the phase of the operating current and the phase of the instructed current to calculate a norm correction and to obtain the adjusted vector norm by adding this norm correction to the instructed vector norm.

5. The control device according to claim 1, wherein the correcting unit has a correction calculating block for calculating a correction required to correct the instructed vector norm when the torque feed-back control unit steadily controls the machine to stably generate the target torque.

6. The control device according to claim 1, wherein the correcting unit has a correction calculating block for calculating a norm correction, required to correct the instructed vector norm, when a difference between a torque generated from the controlled voltage and the target torque is smaller than a predetermined value, a change of a rotational speed in the machine is smaller than a predetermined value, or a change of the target torque is smaller than a predetermined value.

7. The control device according to claim 1, wherein the correcting unit has a correction calculating block for calculating a norm correction required to correct the instructed vector norm, a correction storing block for storing the calculated norm correction, and a correction performing block for reading out the norm correction from the correction storing block to correct the instructed vector norm to the adjusted vector norm by the norm correction.

8. The control device according to claim 7, wherein the correction storing block has a storing area partitioned into a plurality of regions corresponding to respective values of a control or controlled variable indicating an operating state of the machine, the correction storing block stores the norm correction, calculated when the control or controlled variable is set at each of values, in the region corresponding to the value of the control or controlled variable, and the correction performing block corrects the instructed vector norm, corresponding to a particular value of the control or controlled variable, by the norm correction stored in the region corresponding to the particular value of the control or controlled variable.

9. The control device according to claim 7, wherein the correction performing block has a judging block that judges whether the torque feed-back control unit steadily controls the machine to stably generate the target torque, and the correction storing block stores the calculated norm correction in the corresponding region when the judging block judges that the torque feed-back control unit steadily controls the machine.

10. The control device according to claim 7, wherein the correction performing block has a judging block that judges whether or not the machine is operated under a first condition that a difference between the operating torque and the target torque is smaller than a first predetermined value, a second condition that a change of a rotational speed in the machine is smaller than a second predetermined value and a third condition that a change of the target torque in the machine is smaller than a third predetermined value, and the correction storing block stores the calculated norm correction in the corresponding region when the judging block judges that the machine is operated under the first, second and third conditions.

11. The control device according to claim 1, further comprising:
a current feed-back control unit that controls the power inverter circuit according to the operating current flowing through the machine and the instructed current such that the operating current is controlled to the instructed current under a current feed-back control; and
a selection control unit that selects the control of the torque feed-back control unit such that the power inverter circuit outputs the controlled voltage set at the controlled phase and the adjusted vector norm to the machine or selects the control of the current feed-back control unit such that the operating current controlled to the instructed current flows through the machine according to a ratio of the controlled voltage to a voltage inputted to the power inverter circuit.

12. The control device according to claim 11, wherein the current feed-back control unit converts the instructed current to an instructed voltage such that the power inverter circuit outputs the instructed voltage as the controlled voltage to control the operating current to the instructed current, and the selection control unit initializes, when the selection control unit switches the selection from the control of the torque feed-back control unit to the control of the current feed-back control unit, the instructed voltage to a value determined from the controlled phase and the adjusted vector norm determined just before the switching to the control of the current feed-back control unit such that the power inverter circuit outputs the instructed voltage set at the initialized value just after the switching to the control of the current feed-back control unit.

13. The control device according to claim 11, wherein the current feed-back control unit converts the instructed current to an instructed voltage such that the power inverter circuit outputs the instructed voltage as the controlled voltage to control the operating current to the instructed current, and the selection control unit initializes, when the selection control unit switches the selection from the control of the current feed-back control unit to the control of the torque feed-back control unit, the phase of the controlled voltage to a phase of the instructed voltage set just before the switching to the control of the torque feed-back control unit.

14. The control device according to claim 1, wherein the norm calculating unit calculates the instructed vector norm from the target torque and a rotational speed of the machine.

15. A control system, comprising a power inverter circuit and a control device which controls a multi-phase electric rotating machine by controlling the power inverter circuit to output a controlled voltage of a multi-phase current to the machine, the control device comprising:
a phase determining unit that determines a phase of the controlled voltage at a controlled phase to control an operating torque, generated in the machine from the controlled voltage set at the controlled phase, to a target torque under a torque feed-back control;
a norm calculating unit that calculates an instructed vector norm of the controlled voltage while using a parameter indicating a characteristic of the machine to control a current, flowing through the machine in response to the controlled voltage set at the instructed vector norm and the controlled phase, to an instructed current corresponding to the target torque under an open-loop control;
a norm correcting unit that corrects the instructed vector norm of the norm calculating unit to an adjusted vector norm to control an operating current, flowing through the machine in response to the controlled voltage set at the adjusted vector norm and the controlled phase, to the instructed current under a feed-back control; and
a torque feed-back control unit that controls the machine to generate the target torque in response to the controlled voltage, set at the controlled phase of the phase determining unit and the adjusted vector norm of the norm correcting unit, under the torque feed-back control.

* * * * *